US007339708B2

(12) United States Patent
Namizuka

(10) Patent No.: US 7,339,708 B2
(45) Date of Patent: Mar. 4, 2008

(54) IMAGE FORMING APPARATUS IN WHICH AT LEAST ONE APPLICATION FUNCTION CAN BE ADDED TO COPYING FUNCTION

(75) Inventor: Yoshiyuki Namizuka, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 955 days.

(21) Appl. No.: 10/393,945

(22) Filed: Mar. 24, 2003

(65) Prior Publication Data
US 2003/0214682 A1 Nov. 20, 2003

(30) Foreign Application Priority Data
Mar. 22, 2002 (JP) ............................. 2002-082155

(51) Int. Cl.
*H04N 1/04* (2006.01)
(52) U.S. Cl. ..................... 358/474; 358/1.15; 358/473; 358/501; 358/444; 709/713; 709/725
(58) Field of Classification Search ................ 358/474, 358/1.15, 1.13, 400, 500, 501, 505, 473, 358/401, 444; 348/232, 233, 375, 552; 347/5, 347/108; 710/68, 101; 400/582, 10; 709/713, 709/725
See application file for complete search history.

(56) References Cited
U.S. PATENT DOCUMENTS

| 5,208,612 | A | | 5/1993 | Obu et al. |
| 5,250,984 | A | * | 10/1993 | Masai ......................... 399/80 |
| 5,565,854 | A | | 10/1996 | Kataoka et al. |
| 5,687,006 | A | | 11/1997 | Namizuka et al. |
| 5,715,070 | A | * | 2/1998 | Tone et al. .................. 358/468 |
| 5,740,333 | A | * | 4/1998 | Yoh et al. ..................... 358/1.9 |
| 5,752,040 | A | * | 5/1998 | Kaneko et al. ............. 717/170 |
| 5,956,160 | A | | 9/1999 | Watanabe |

(Continued)

FOREIGN PATENT DOCUMENTS
JP 2003-316063 11/2000

(Continued)

OTHER PUBLICATIONS
Patent Abstracts of Japan, JP 03-229308, Oct. 11, 1991.

(Continued)

*Primary Examiner*—Aung S. Moe
*Assistant Examiner*—Negussie Worku
(74) *Attorney, Agent, or Firm*—Oblon, Spivak, McClelland, Maier & Neustadt, P.C.

(57) ABSTRACT

An image forming apparatus for performing at least a copying function includes an engine board, an image reading unit, an image forming unit, a controller board detachably connected to the engine board to add at least one application function to the copying function of the image forming apparatus, an operation unit, and a parallel bus that connects the controller board to the engine board. When the controller board is connected to the engine board, the operation unit displays information of the copying function and the at least one application function, and when the controller board is detached from the engine board, the operation unit displays the information of the copying function. Each of display layouts of the operation unit for the copying function is substantially identical between when the controller board is connected to the engine board and when the controller board is detached from the engine board.

18 Claims, 15 Drawing Sheets

U.S. PATENT DOCUMENTS

| | | | | |
|---|---|---|---|---|
| 6,104,430 | A | * | 8/2000 | Fukuoka .................. 348/231.6 |
| 6,211,967 | B1 | * | 4/2001 | Namizuka .................... 358/1.2 |
| 6,330,027 | B1 | * | 12/2001 | Haba ..................... 348/211.99 |
| 6,438,631 | B1 | * | 8/2002 | Kawase ........................ 710/68 |
| 6,559,977 | B2 | * | 5/2003 | Sasai et al. ................. 358/400 |
| 6,570,667 | B1 | * | 5/2003 | Hattori et al. ............. 358/1.15 |
| 6,634,817 | B2 | * | 10/2003 | Serizawa .................... 400/582 |
| 6,799,212 | B1 | * | 9/2004 | Iyoki .......................... 709/224 |
| 2001/0015821 | A1 | | 8/2001 | Namizuka et al. |
| 2001/0019429 | A1 | | 9/2001 | Oteki et al. |
| 2002/0114000 | A1 | * | 8/2002 | Kobayashi ................. 358/1.15 |

FOREIGN PATENT DOCUMENTS

JP    2001-67201    3/2001

OTHER PUBLICATIONS

U.S. Appl. No. 10/393,945, filed Mar. 24, 2003, Namizuka.
U.S. Appl. No. 10/805,184, filed Mar. 22, 2004, Namizuka.
U.S. Appl. No. 10/632,957, filed Aug. 4, 2003, Namizuka.
Patent Abstracts of Japan, JP 2001-238019, Aug. 31, 2001.
U.S. Appl. No. 10/078,713, filed Feb. 19, 2002, Namizuka.
U.S. Appl. No. 09/960,944, filed Sep. 25, 2001, Namizuka et al.
U.S. Appl. No. 09/847,192, filed May 2, 2001, Fukuda et al.
U.S. Appl. No. 09/551,509, filed Apr. 17, 2000, Namizuka et al.
U.S. Appl. No. 09/654,050, filed Sep. 1, 2000, Miyazaki et al.
U.S. Appl. No. 09/665,054, filed Sep. 19, 2000, Takahashi et al.
U.S. Appl. No. 09/693,987, filed Oct. 23, 2000, Kawamoto et al.
U.S. Appl. No. 09/705,836, filed Nov. 6, 2000, Oteki et al.
U.S. Appl. No. 09/704,624, filed Nov. 3, 2000, Namizuka.
U.S. Appl. No. 09/706,783, filed Nov. 7, 2000, Miyazaki et al.
U.S. Appl. No. 09/706,781, filed Nov. 7, 2000, Oteki et al.
U.S. Appl. No. 09/713,194, filed Nov. 16, 2000, Namizuka et al.
U.S. Appl. No. 09/725,569, filed Nov. 30, 2000, Namizuka et al.
U.S. Appl. No. 09/735,649, filed Dec. 14, 2000, Fukuda et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/749,819, filed Dec. 28, 2000, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/801,843, filed Mar. 9, 2001, Fukuda et al.

* cited by examiner

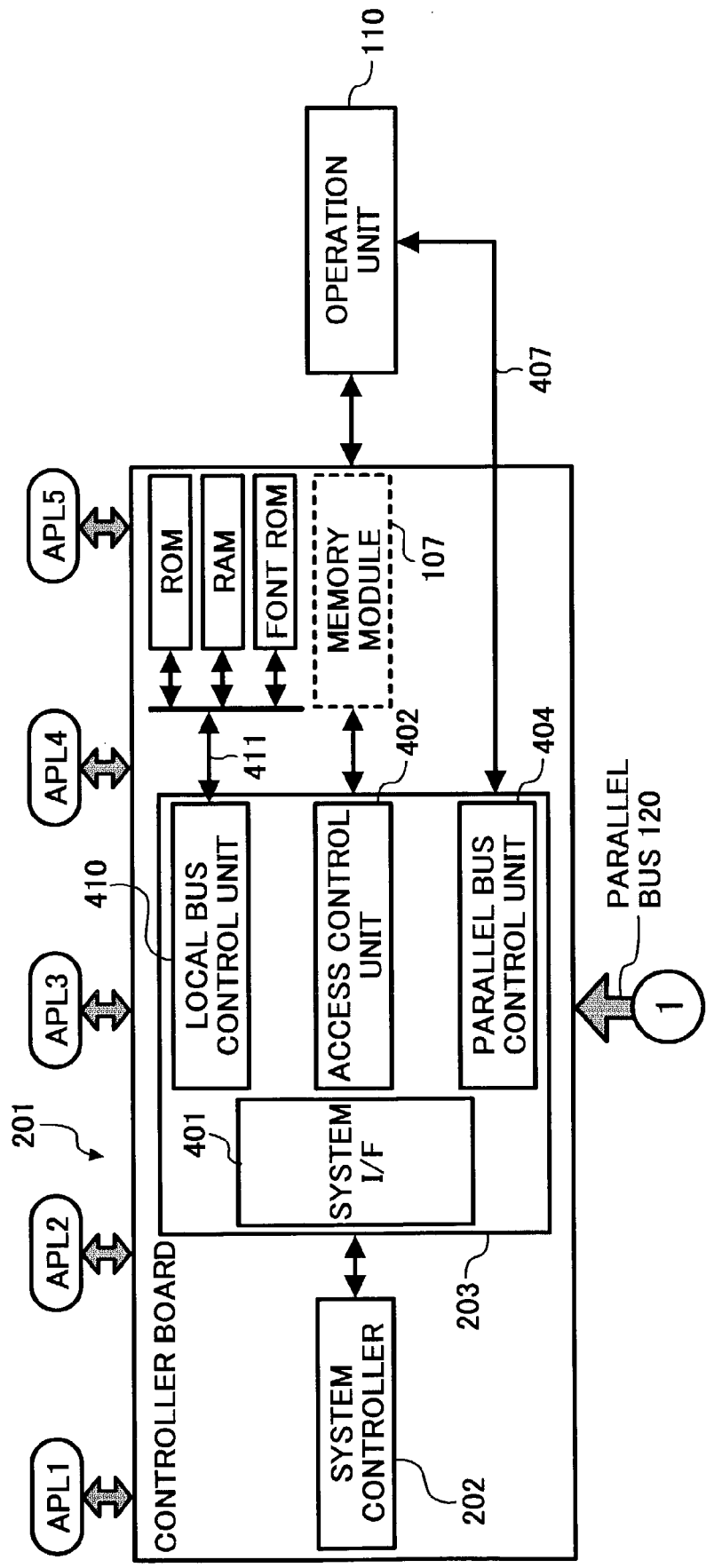

IMAGE FORMING APPARATUS IN WHICH AT LEAST ONE APPLICATION FUNCTION CAN BE ADDED TO COPYING FUNCTION

CROSS-REFERENCE TO RELATED APPLICATIONS

The present application claims priority to Japanese Patent Application No. 2002-082155 filed in the Japanese Patent Office on Mar. 22, 2002, the disclosure of which is incorporated herein by reference.

BACKGROUND OF THE INVENTION

1. Field of the Invention

The present invention relates to an image forming apparatus for performing at least a copying function that scans an image of an original document and forms an image on a transfer sheet based on scanned image data, and more particularly relates to a multi-functional digital image forming apparatus in which at least one application function is added to the copying function.

2. Discussion of the Background

With regard to a background multi-functional digital image forming apparatus that performs copying, faxing, printing, and scanning functions, an image processing device in which a memory is effectively used in multiple functions, a control mechanism including an expansion unit is shared, and resources for each image processing device are effectively utilized has been proposed. Such a multi-functional digital image forming apparatus includes a construction that allows resources for each image processing device to be shared while controlling a plurality of application programs.

FIG. 1 is a block diagram of an entire configuration of a background image processing device. An image reading unit 1301 optically reading an image of an original document includes a lamp, mirrors, and a lens. Reflected light of the lamp irradiation by the original document is collected onto a photoreceptor through the mirrors and the lens.

The photoreceptor, for example, a CCD (Charge Coupled Device) is installed on a sensor board unit 1302. The image data converted into an electrical signal by the CCD is converted into a digital signal for output from the sensor board unit 1302.

The image data, which is output from the sensor board unit 1302, is input to an image data control unit 1303. The image data control unit 1303 controls all the transmission of the image data between functional devices and a data bus. The image data control unit 1303 performs data transfer of the image data among the sensor board unit 1302, a parallel bus 1320, and an image processing processor 1304, and performs communication between a system controller 1331 for the entire control of the image processing device and a process controller 1311.

The image data output from the sensor board unit 1302 is transferred to the image processing processor 1304 through the image data control unit 1303, and is output to the image data control unit 1303 again, after correction of signal degradation (signal degradation of the scanner system) due to the optical system and quantization into digital signals.

There are two kinds of jobs, that is, a job to re-use the read image data after storage in a memory, and a job not to reuse the read image data without storage. Hereinafter, the two jobs will be described. As an example of a case of storing the image data in the memory, when a plurality of copies are made for one sheet of an original document, the image reading unit 1301 is operated one time to read an image of the original document, and read image data is stored in the memory. The read image data in the memory is read out a plurality of times for making a plurality of copies. As an example of a case of not storing the image data in the memory, when one copy is made for one sheet of an original document, the read image data is reproduced as it is. Therefore, the access to the memory is not necessary.

In the case of not storing the image data in the memory, the image data transferred from the image processing processor 1304 to the image data control unit 1303 is returned again to the image processing processor 1304 from the image data control unit 1303. The image processing processor 1304 performs image quality control of conversion of the brightness data obtained by CCD into the area gradation.

The image data after the image quality processing is transferred to a video data control unit 1305 from the image processing processor 1304. After post-processing of signals, which are changed into area gradation data, for dot arrangement, and pulse control for reproducing the dots, a reproduced image is formed on a transfer sheet in an image forming unit 1306.

Hereinafter, a description will be made of flow of image data during additional processing, such as, for example, rotation of the image direction and image synthesis, which is performed when retrieving image data stored in the memory. The image data transferred from the image processing processor 1304 to the image data control unit 1303 is sent to an image memory access control unit 1321 from the image data control unit 1303 via the parallel bus 1320. In the image memory access control unit 1321, access control of image data and a memory module 1322, expansion of print data of an external personal computer (PC) 1323, and compression/expansion of image data for effective use of the memory are performed based on the control of the system controller 1331.

The image data sent to the image memory access control unit 1321 is stored in the memory module 1322 after data compression to read out the stored image data as required. The read-out image data is expanded, restored to original image data, and returned to the image data control unit 1303 from the image memory access control unit 1321 via the parallel bus 1320.

After transferring to the image processing processor 1304 from the image data control unit 1303, image quality processing, and pulse control in the video data control unit 1305 are performed, and a reproduced image is formed on a transfer sheet in the image forming unit 1306.

The multiple functions of the digital image forming apparatus are achieved by bus control at the parallel bus 1320 and the image data control unit 1303 in the image data flow. The facsimile transmission function performs image processing of the read image data in the image processing processor 1304, and transfers the data to a facsimile control unit 1324 via the image data control unit 1303 and the parallel bus 1320. Data conversion of the data for the communication network is performed in the facsimile control unit 1324, and the data is sent to a public network 1325 as facsimile data.

As for the received facsimile data, line data from the public network 1325 is converted into image data in the facsimile control unit 1324, and transferred to the image processing processor 1304 via the parallel bus 1320 and the image data control unit 1303. In this case, special image quality processing is not performed, and reproduced images are formed on a transfer sheet in the image forming unit 1306 after dot re-arrangement and pulse control in the video data control unit 1305.

When a plurality of jobs, for example, copying function, facsimile sending and receiving function, and printer output function are simultaneously operated, a system controller 1331 and the process controller 1311 control job allocation of the right of using the image reading unit 1301, the image forming unit 1306, and the parallel bus 1320. The process controller 1311 controls the flow of image data, and the system controller 1331 controls the entire system and manages the activation of each resource.

As for function selection of the multi-functional digital image forming apparatus, processing contents, such as the copying function, and the facsimile function, are set by selection input on an operation panel 1334. The system controller 1331 and the process controller 1311 communicate each other though the parallel bus 1320, the image data control unit 1303, and the serial bus 1310. Specifically, in the image data control unit 1303, communications between the system controller 1331 and the process controller 1311 are performed by converting data formats to each other for respective data interfaces to the parallel bus 1320 and the serial bus 1310.

Input/output signals to/from a drive mechanism and various kinds of sensors in an image forming apparatus are detected and controlled at the port of an I/O control unit 1340. The process controller 1311 controls the signal detection and drive signals, and monitors output signals from the sensors.

The above-described background image processing device has a configuration in which resources are shared by multiple application functions. In this case, for a user who requests to use only a basic function (i.e., a copying function), unnecessary constructions are included in the above image processing device, thereby causing the increase of the cost of an apparatus and undesired power consumption.

SUMMARY OF THE INVENTION

Accordingly, the present invention advantageously provides an image forming apparatus which can provide a user with a basic (copying) function at a low cost and to which multiple application functions can be easily added.

According to one aspect of the present invention, an image forming apparatus for performing at least a copying function, includes an engine board, an image reading unit configured to read an image of an original document to obtain image data and also configured to transfer the image data to the engine board, and an image forming unit configured to receive the image data from the engine board and to form the image on a transfer sheet based on the image data. The image forming apparatus further includes a controller board detachably connected to the engine board to add at least one application function to the copying function of the image forming apparatus, an operation unit configured to receive an operational instruction input by an operator of the image forming apparatus and to display information of the at least copying function of the image forming apparatus, and a parallel bus configured to connect the controller board to the engine board and to notify the engine board that the controller board is connected to the engine board when the controller board is connected to the engine board. When the controller board is connected to the engine board, the operation unit displays the information of the copying function and the at least one application function, and when the controller board is detached from the engine board, the operation unit displays the information of the copying function, and each of display layouts of the operation unit for the copying function is substantially identical between when the controller board is connected to the engine board and when the controller board is detached from the engine board.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 13A is a block diagram illustrating a condition of each of the units of a controller board connected to an engine board via a parallel bus, in an image forming apparatus having expanded functions when a system is in a standby mode;

DESCRIPTION OF THE PREFERRED EMBODIMENTS

Figure 1:
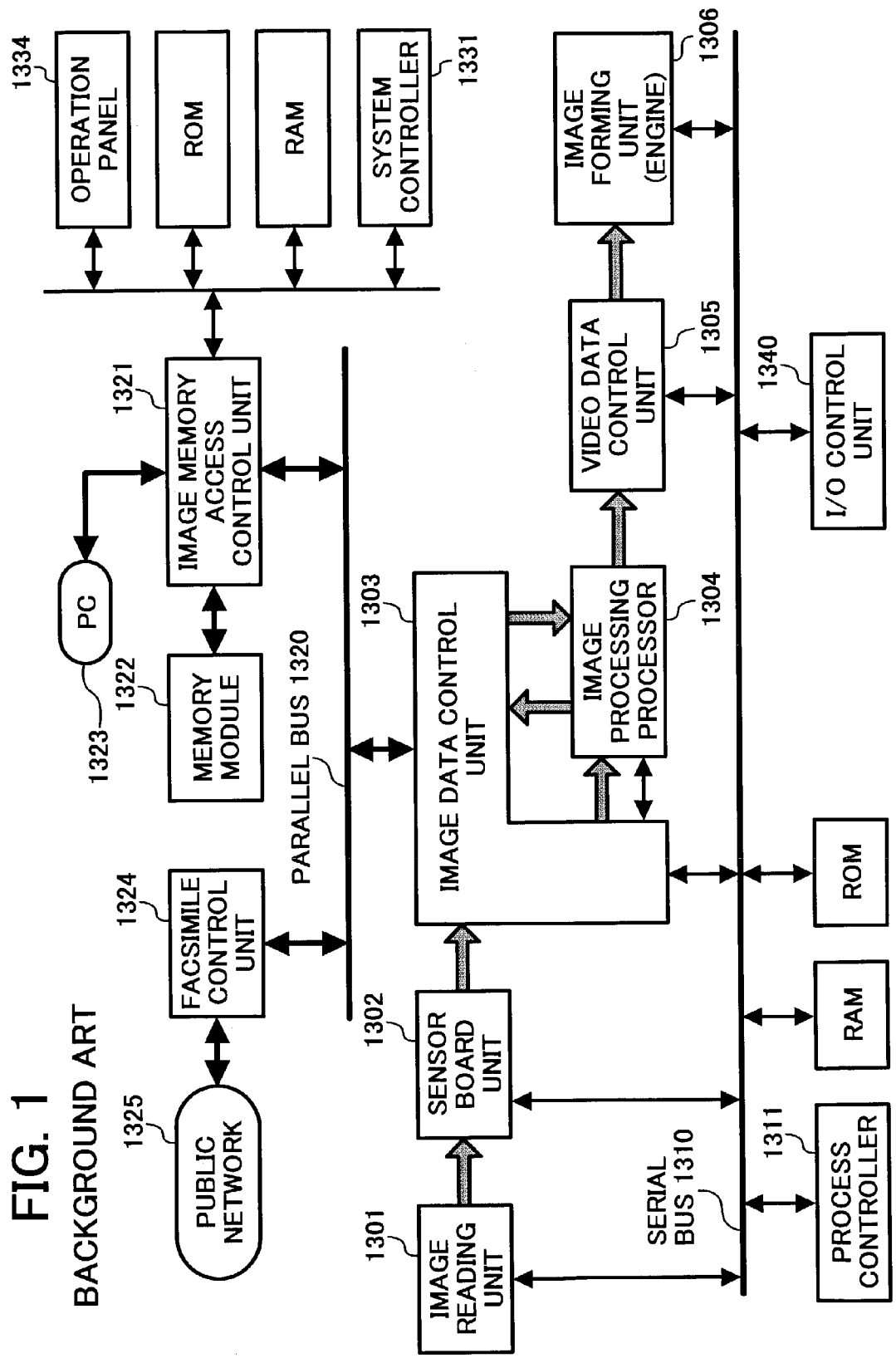
FIG. 1 is a block diagram of an entire configuration of a background image processing device.

Preferred embodiments of the present invention are described in detail referring to the drawings, wherein like reference numerals designate identical or corresponding parts throughout the several views.

Figure 2:
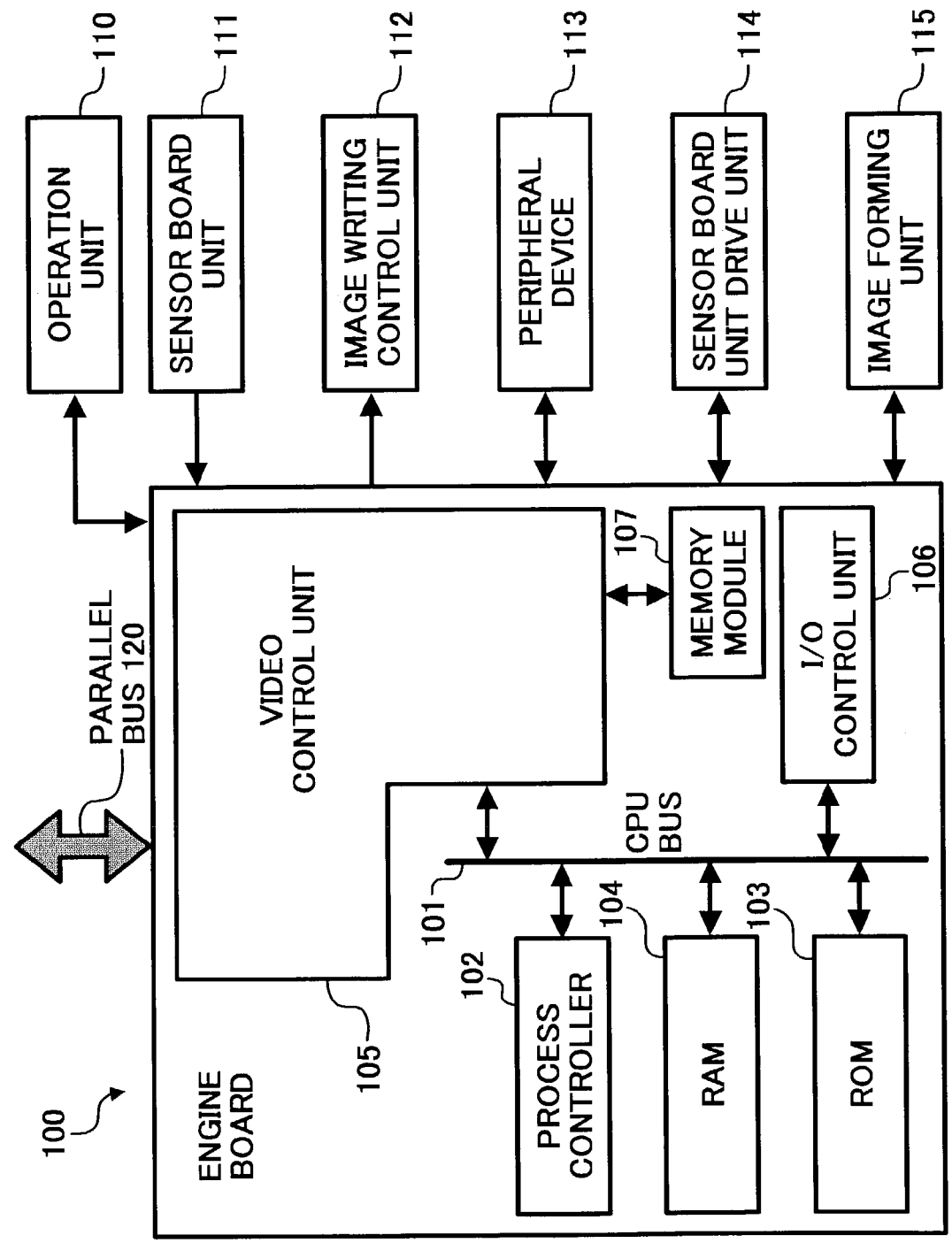
FIG. 2 is a block diagram of a configuration of an image forming apparatus having a copying function according to an embodiment of the present invention.
Figure 3:
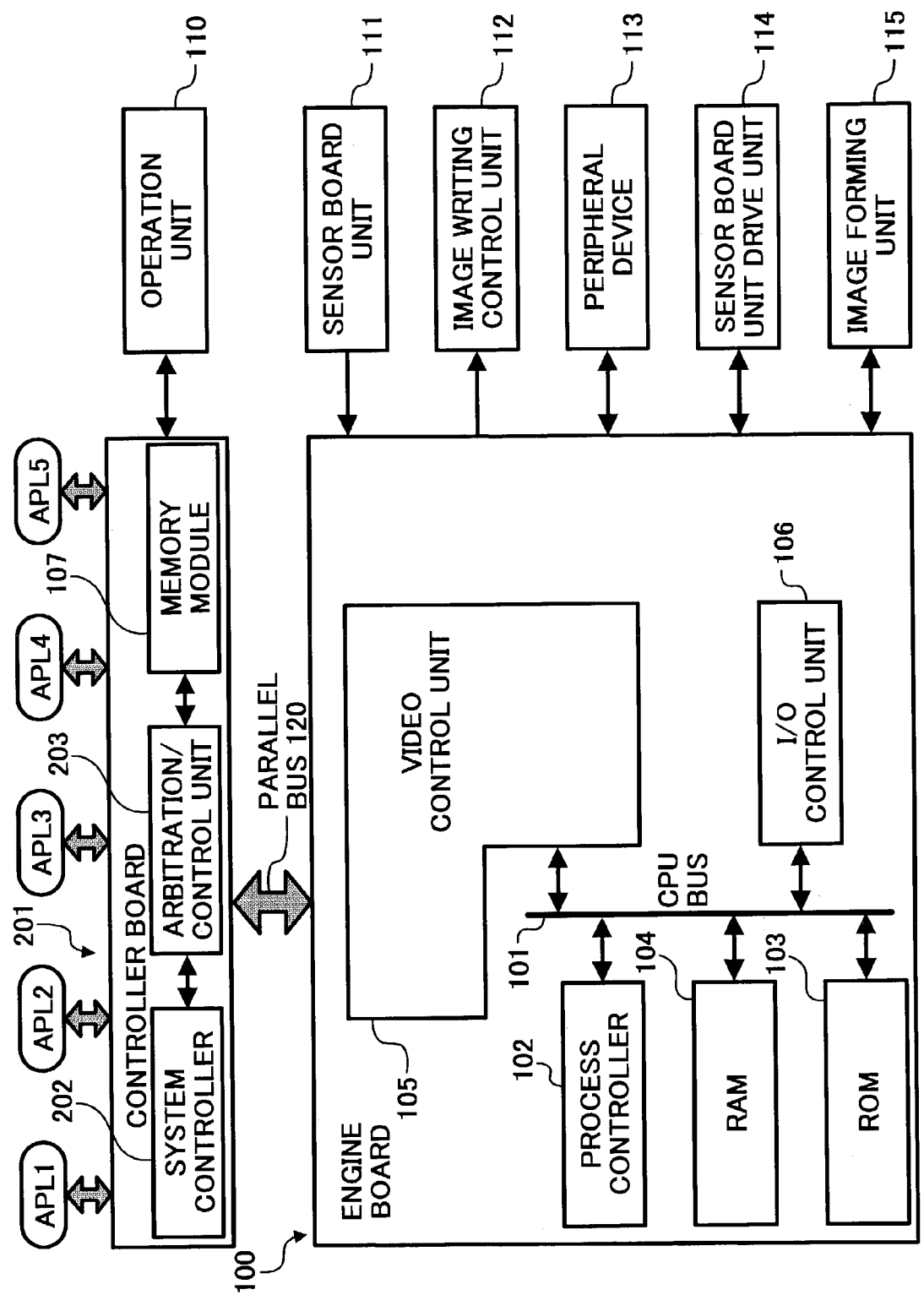
FIG. 3 is a block diagram of a configuration of a multi-functional digital image forming apparatus having expanded functions according to another embodiment of the present invention.

FIG. 2 is a block diagram of a configuration of an image forming apparatus having a basic (copying) function (i.e., a copying machine) according to an embodiment of the present invention. FIG. 3 is a block diagram of a configuration of a multi-functional digital image forming apparatus having expanded functions according to another embodiment of the present invention. The configuration of the multi-functional digital image forming apparatus illustrated in FIG. 3 provides functions substantially similar to those of the background multi-functional image processing device of FIG. 1.

A basic configuration of a copying machine will be described referring to FIG. 2. This unit configuration provides a basic copying function, but does not provide multiple functions, such as, for example, faxing, printing, and network connection functions which are generally performed in a multi-functional digital image forming apparatus. However, because the copying machine includes a terminal of an interface (hereafter referred to as an "I/F") used for functional expansion, the copying machine can be easily converted to a digital image forming apparatus in which the above-described multiple functions are performed (described below).

An engine board 100 performs an image data control function. On the engine board 100, there are provided a local central processing unit (CPU) bus 101, a process controller 102, a read-only memory (ROM) 103, a random-access memory (RAM) 104, a video control unit 105, an input/output (I/O) control unit 106, and a memory module 107. The process controller 102 controls each unit to operate. The instruction of operation is stored in the ROM 103, and work data at the time of processing is stored in the RAM 104. The video control unit 105 processes image data and controls a flow of data. The I/O control unit 106 monitors and controls control signals input to and output from each drive unit, and each connection condition of option units (described below) to the engine board 100. The process controller 102, the ROM 103, the RAM 104, the video control unit 105, and the I/O control unit 106 are connected to each other through the CPU bus 101. A memory module 107 used for storing image data is accessed and controlled by the video control unit 105.

A plurality of option units are connected to the engine board 100. The option units include an operation unit 110, a sensor board unit 111 functioning as an image reading unit, an image writing control unit 112, a peripheral device 113 including a sheet feeding system and a sheet discharging system, a sensor board unit drive unit 114 that drives the sensor board unit 111, and an image forming unit 115. The image forming unit 115 cooperates with the image writing control unit 112 to function as an image forming unit.

The operation unit 110 is connected to the process controller 102 through a central processing unit (CPU) periphery control unit 306 (illustrated in FIG. 6) provided in the video control unit 105 via a serial port. The operation unit 110 receives an operational instruction input by an operator of the copying machine and displays the information of the copying function of the copying machine. The video control unit 105 makes the operation unit 110 display the information of the copying function, and outputs command data transmitted from the operation unit 110 to the process controller 102. The process controller 102 monitors and controls each of the option units based on the operational instruction input to the operation unit 110 through the I/O control unit 106.

In the case of copying operation, the process controller 102 controls the sensor board unit drive unit 114 to drive the sensor board unit 111 based on control signals. The sensor board unit 111 optically reads an image of an original document, and transfers digitized image data to the video control unit 105. The video control unit 105 subjects the image data obtained by the sensor board unit 111 to image processing, and stores the image data in the memory module 107. At this time, the image data is stored in the memory module 107 in both cases of making a plurality of copies and a single copy in order to backup the image data in case a sheet jam occurs in the image forming unit 115.

The image data read out from the memory module 107 is subjected to smoothing process and pulse-width modulation (PWM) process by the video control unit 105, and is transferred to the image writing control unit 112. Subsequently, laser diodes (LD) in the image writing control unit 112 are driven for writing an image based on the image data, and an image is formed on a transfer sheet by the image forming unit 115.

By the above-described processes, a copy of an image of an original document is obtained. The peripheral device 113 feeds a transfer sheet to the image forming unit 115 and performs a post-processing such as stapling and discharging of a transfer sheet after an image is formed on the transfer sheet. The engine board 100 includes a parallel bus I/F (described below) that is connected to a parallel bus 120. The parallel bus 120 is not used for a basic function (i.e., a copying function) of the copying machine but used for expanded functions of a multi-functional digital image forming apparatus (described below).

In the configuration of the copying machine illustrated in FIG. 2 that has a basic (copying) function, the memory module 107 is provided on the engine board 100 for storing image data, thereby providing operational functions without placing constraints on basic essential functions, such as, an image rotation, an electronic sort, and an output of historic records, which are required in a digital copying machine. The memory module 107 is unitized and may be implemented as a double inline memory module (DIMM). When the memory module 107 is not needed on the engine board 100, the memory module 107 is detached from the engine board 100 and is used as a memory for a controller board 201 (illustrated in FIG. 3), and thereby a hardware resource can be effectively used without waste.

Next, a configuration of a multi-functional digital image forming apparatus having expanded functions will be described referring to FIG. 3. In the configuration of the multi-functional digital image forming apparatus of FIG. 3, expanded functions are added to a basic (copying) function performed by the copying machine of FIG. 2.

Referring to FIG. 3, the controller board 201 functioning as a motherboard is connected to the parallel bus 120 of the engine board 100. When the controller board 201 is connected to the engine board 100 via the parallel bus 120, the parallel bus 120 notifies the engine board 100 that the controller board 201 is connected to the engine board 100. On the controller board 201, there are provided a system controller 202 that monitors and controls the entire multi-functional digital image forming apparatus, an arbitration/control unit 203 that arbitrates the right to use resources shared by a plurality of applications, the memory module 107, and terminals for connection to a plurality of external devices used for expanding functions. In order to expand functions easily, these external devices can be independently connected to the terminals of the controller board 201 in any particular order.

When the controller board 201 is connected to the engine board 100, the operation unit 110 is connected to the controller board 201. The operation unit 110 is a resource used in common by a plurality of application functions, for example, APL1 through APL5 in FIG. 3, and is monitored and controlled by the system controller 202 via the arbitration/control unit 203.

As compared to the copying machine of FIG. 2 which has a basic function, the multi-functional digital image forming apparatus of FIG. 3 has expanded functions and a different configuration. Specifically, the digital image forming apparatus of FIG. 3 provides multiple functions by adding the controller board 201 to the engine board 100 that is controlled by the process controller 102 and by adding a plurality of application functions (APL1 through APL5) to the copying function. The system controller 202 controls the multiple functions including the copying function and the application functions (APL1 through APL5).

The operation of the engine board 100 in the multi-functional digital image forming apparatus of FIG. 3 is substantially similar to that of the engine board 100 in the copying machine of FIG. 2. However, in the multi-functional digital image forming apparatus of FIG. 3, the system controller 202 and the process controller 102 communicate with each other via the parallel bus 120, and allocate resources of the multi-functional digital image forming apparatus. Further, in the multi-functional digital image forming apparatus of FIG. 3, the memory module 107 is detached from the engine board 100, and is used on the controller board 201 as a resource for the copying function and the application functions (APL1 through APL5). The memory module 107 may be added to a pre-installed memory on the controller board 201. In the present embodiment, for example, the video control unit 105, the memory module 107, the sensor board unit 111, the image writing control unit 112, the peripheral device 113, the sensor board unit drive unit 114, and the image forming unit 115 construct resources of the image forming apparatus which are shared among the copying function and the application functions (APL1 through APL5).

Examples of the application functions (APL1 through APL5) include faxing, printing, networking, scanning, local storage (LS), document storing, and document distributing functions. The copying function is positioned as one of these application functions.

The arbitration/control unit 203 arbitrates a network control, and an access control to the memory module 107, and allocates resources to each application function. When a plurality of application functions are simultaneously operated, the system controller 202 and the process controller 102 allocate the resource exclusive right of the engine board 100 while dividing into an image reading function and an image forming function. The system controller 202 controls the expanded functions added to the basic function performed by the engine board 100. The process controller 102 controls the operations of the engine board 100, the sensor board unit 111, the image writing control unit 112, the peripheral device 113, the sensor board unit drive unit 114, and the image forming unit 115 in accordance with the instruction of the system controller 202. The system controller 202 and the process controller 102 share the load caused by the multiple functions of the digital image forming apparatus.

Figure 4:
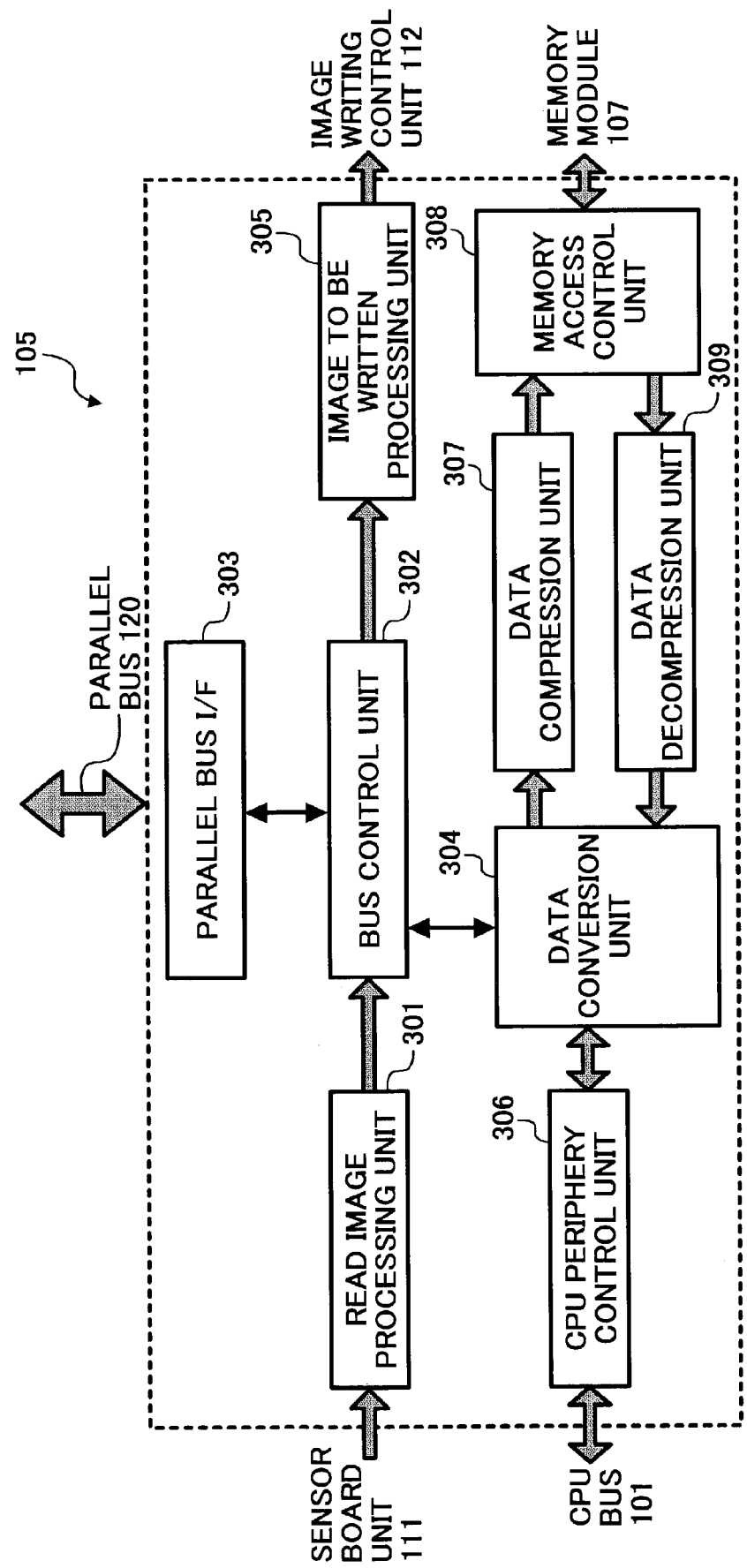
FIG. 4 is a block diagram of a configuration of a video control unit on an engine board in the image forming apparatuses of FIGS. 2 and 3.

FIG. 4 is a block diagram of a configuration of the video control unit 105 on the engine board 100. The image data sent from the sensor board unit 111 is subjected to correction processing in a read image processing unit 301, such as, for example, shading correction, modulation transfer function (MTF) correction, density conversion, gradation processing, and image size changing processing. For example, a high-speed hardware or a programmable processor may be used as the read image processing unit 301.

A bus control unit 302 controls the flow of data. Specifically, the bus control unit 302 selects operations, such as controlling input/output signals to/from a parallel bus I/F 303, switching a path to a data conversion unit 304, and selecting a path to an image to be written processing unit 305, based on the control of the process controller 102. The image to be written processing unit 305 converts the signal input to the image to be written processing unit 305 to the signal that drives the image writing control unit 112, and performs image quality processing, such as, jaggy correction, density conversion, pulse width modulation (PWM), and image trimming processing. The image to be written processing unit 305 transfers modulation signals to the image writing control unit 112, thereby driving laser diodes (LD) by a LD driver (not shown) in the image writing control unit 112. As a result, the image writing control unit 112 forms a latent image.

The data conversion unit 304 achieves separation between image data and command data. The command data is transferred to the process controller 102 via a central processing unit (CPU) periphery control unit 306. In the multi-functional digital image forming apparatus in which expanded functions are added to the copying function, the command data is communicated between the system controller 202 and the process controller 102.

The image data is coded in a data compression unit 307 for storage in the memory module 107, and a memory access control unit 308 stores the code data in the memory module 107 while the memory access control unit 308 keeps track of the address in the memory module 107. When reading out the stored code data from the memory module 107, the memory access control unit 308 retrieves the code data at a specific address in the memory module 107. A data decompression unit 309 decodes the code data that have been retrieved from the memory module 107 into image data. When obtaining a rotated image, the image data that has been once decoded is saved again in a work area in the memory module 107 without being coded. Subsequently, the rotated image is obtained while changing the reading address.

Figure 5:
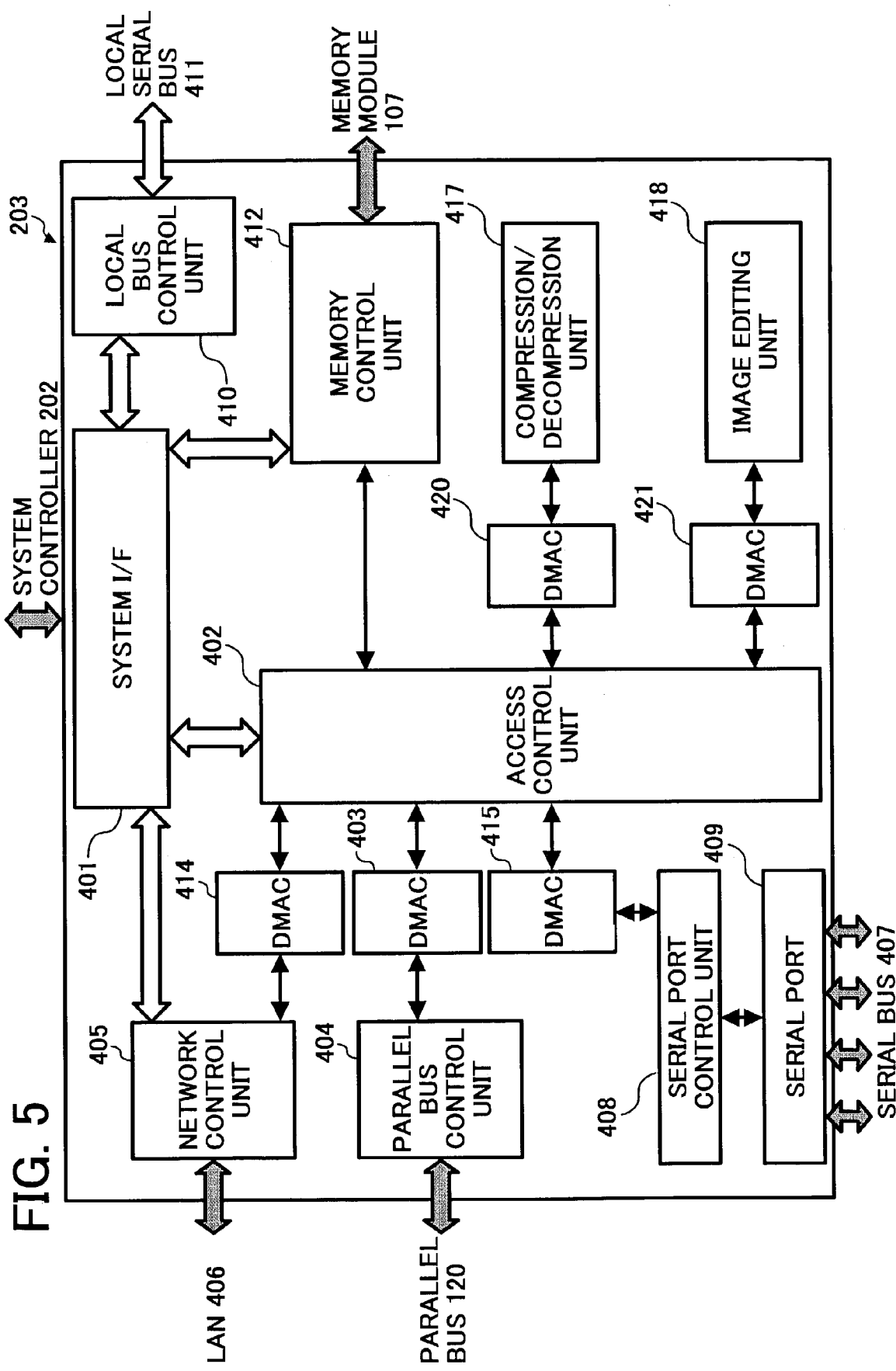
FIG. 5 is a block diagram of a configuration of an arbitration/control unit on a controller board in the multi-functional digital image forming apparatus of FIG. 3.

FIG. 5 is a block diagram of a configuration of the arbitration/control unit 203 provided on the controller board 201. A system interface (I/F) 401 transmits image data and command data to or receives image data and command data from the system controller 202. Basically, the system controller 202 controls the entire operation of the image forming apparatus. Further, the system controller 202 manages distribution of the memory module 107 according to intended uses. The control operations for option units, such as, the operation unit 100, the sensor board unit 111, the image writing control unit 112, the peripheral device 113, the sensor board unit drive unit 114, and the image forming unit 115 are performed by the process controller 102 based on the instruction of the system controller 202 via the system I/F 401, an access control unit 402, a direct memory access control (DMAC) 403, a parallel bus control unit 404, and the parallel bus 120.

Each of the option units in the digital image forming apparatus is basically connected to the parallel bus 120. Therefore, the parallel bus control unit 404 manages transmission of data to or reception of data from the system controller 202 and the memory module 107 while controlling the right of using the parallel bus 120. A network control unit 405 controls connection to a local area network (LAN) 406, and manages transmission of data to or reception of data from externally extended device that is connected to the network. The system controller 202 is not involved in the management of operation of the connected device on the network, but controls the interface in the arbitration/control unit 203.

A serial port 409 connected to a serial bus 407 has a plurality of ports. A serial port control unit 408 has port control mechanisms corresponding to the number of types of prepared buses. For example, port-controls for universal serial bus (USB) and IEEE 1284 are performed. Other than the serial ports 409 connected to the external devices, the serial port control unit 408 controls the acceptance of command data from the operation unit 110 and transmission of data to or reception of data concerning display layout from the operation unit 110.

A local bus control unit 410 interfaces with a local serial bus 411 that is connected to a RAM and a ROM which are required for activating the system controller 202, and is also connected to a font ROM. Code data is changed to image data by use of the font ROM. A memory control unit 412 interfaces with the memory module 107.

The operation controls of the arbitration/control unit 203 are performed by the system controller 202 by executing command control via the system I/F 401. The arbitration/control unit 203 performs the data controls by managing accesses to the memory module 107 from units other than the arbitration/control unit 203. The image data is transferred from the engine board 100 to the arbitration/control unit 203 via the parallel bus 120. The image data is input into the arbitration/control unit 203 in the parallel bus control unit 404. Memory access for the input image data is controlled by the DMAC 403, under no management of the system controller 202. That is, the access to the memory module 107 is performed based on the direct memory access control, separately from the system control.

The access control unit 402 adjusts requests for access from a plurality of units to the memory module 107. The memory control unit 412 provides controls for access operation to and the reading/writing of data from/to the memory module 107. When an access is made from the network (LAN) 406 to the memory module 107, the data loaded in the arbitration/control unit 203 from the network via the network control unit 405 is transferred to the memory module 107 by a DMAC 414. The access control unit 402 adjusts accesses to the memory module 107 by a plurality of jobs. The memory control unit 412 reads and writes image data from and in the memory module 107.

When an access is made from the serial bus 407 to the memory module 107, the data loaded in the arbitration/control unit 203 via the serial port 409 by the serial port control unit 408 is transferred to the memory module 107 by a DMAC 415. The access control unit 402 adjusts accesses to the memory module 107 by a plurality of jobs. The memory control unit 412 reads and writes image data from and in the memory module 107.

The system controller 202 changes the data to be printed out, that is sent from an external personal computer connected to the network (LAN) 406 or the serial bus 407, to image data by use of the font ROM connected to the local serial bus 411. The image data is stored in a memory area in the memory module 107.

The system controller 202 manages interfaces with respective units other than the arbitration/control unit 203. The respective DMACs 403, 414, and 415 manage accesses to the memory module 107 after the data is loaded into the arbitration/control unit 203. In this case, each of the DMACs 403, 414, and 415 executes data transfer independently, therefore, the access control unit 402 gives priorities to jobs concerning accesses to the memory module 107 when a collision occurs between the jobs, or to access requests.

The access to the memory module 107 includes an access from the system controller 202 via the system I/F 401 in order to change code data to image data by use of font data, other than accesses by the DMACs 403, 414, and 415. The memory control unit 412 directly transfers the data from any DMACs 403, 414, and 415, that are permitted to get access to the memory module 107 in the access control unit 402, or the data from the system I/F 401 to the memory module 107.

The arbitration/control unit 203 further includes a compression/decompression unit 417 and an image editing unit 418 in which data processing is performed. The compression/decompression unit 417 is a module that compresses and decompresses data for effective storage of image data or code data in the memory module 107. The compression/decompression unit 417 controls interface with the memory module 107 through a DMAC 420. The image data once stored in the memory module 107 is retrieved from the memory module 107 to the compression/decompression unit 417 via the memory control unit 412 and the access control unit 402 by the control of the DMAC 420. The image data is changed to code data in the compression/decompression unit 417 and is returned to the memory module 107 or is output to an external device.

The image editing unit 418 controls the memory module 107 by a DMAC 421, and performs data processing in the area of the memory module 107. Specifically, the image editing unit 418 performs data processing, such as, clear of memory areas, rotation of image data, and synthesis of different images. The image editing unit 418 also performs edits so as to convert target data to be processed by controlling its address on the memory. The image editing unit 418 performs edits on a bitmap image changed from code data in the memory module 107, but not on the compressed code data. The image compression for effective storage of the images in the memory is executed on the data after the image is edited.

Figure 6:
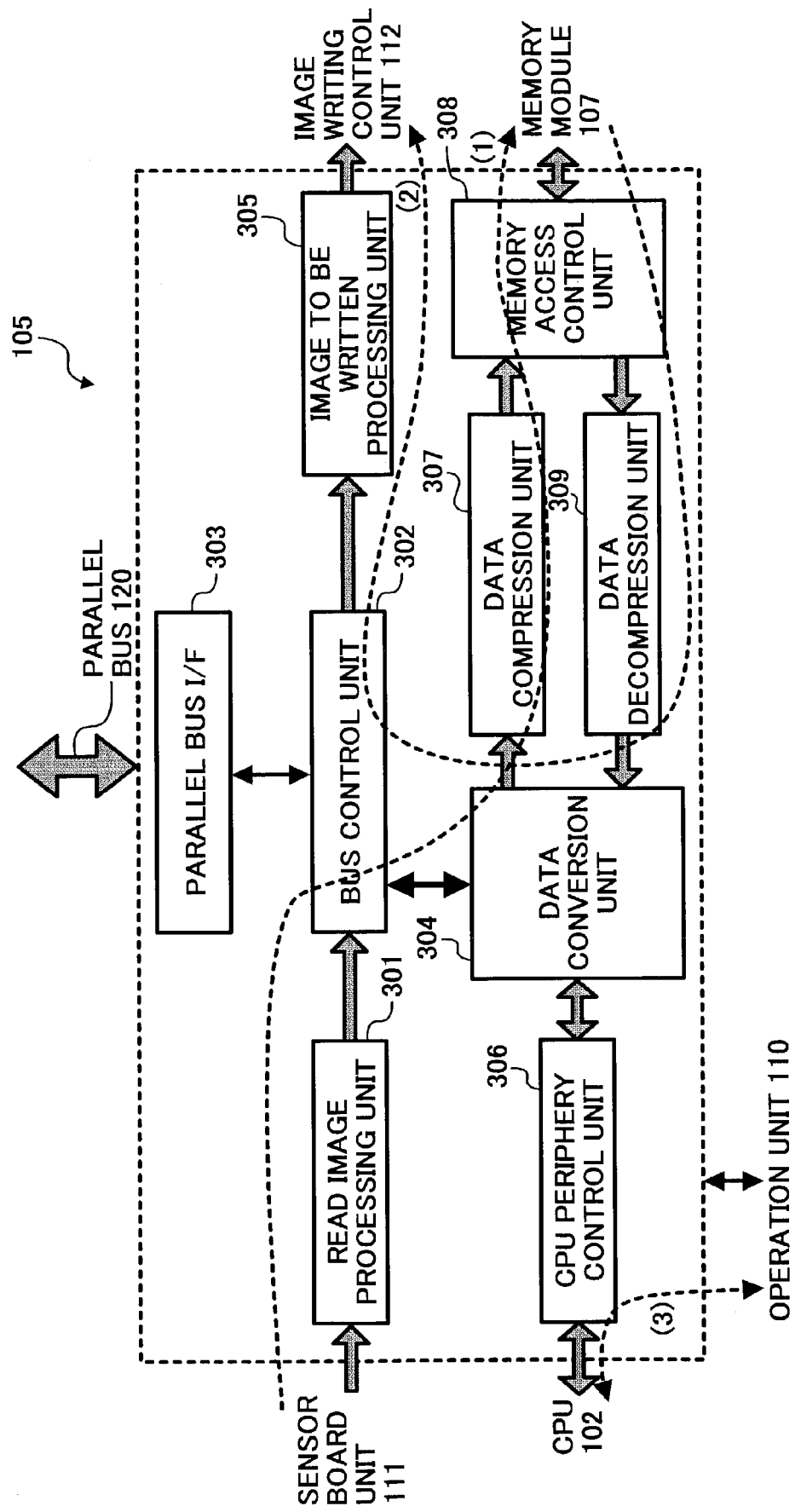
FIG. 6 is a block diagram for explaining respective flows of data in the image forming apparatus having the copying function.

FIG. 6 is a block diagram for explaining respective flows of data in the image forming apparatus having a basic (copying) function. FIG. 6 includes the block diagram of the configuration of the video control unit 105 illustrated in FIG. 4.

The flow indicated by (1) in FIG. 6 is a reading path from the reading of an image of an original document to the storage of image data in a memory. The flow indicated by (2) in FIG. 6 is a path from the reading out of the image data stored in the memory to an image writing control. The flow indicated by (3) in FIG. 6 is an input/output control path when operating an operation unit. In the image forming apparatus having a basic (copying) function, the controller board 201 is not connected to the engine board 100, and transmission and reception of data via the parallel bus 120 are not performed. The memory module 107 on the engine board 100 is used as a memory for storing image data.

(1) Reading Path

The image data optically read by the sensor board unit 111 and converted into an electrical signal is subjected to the correction processing in the read image processing unit 301. The image data that has been subjected to the correction processing in the read image processing unit 301 is transferred to the data conversion unit 304 by the bus control unit 302. The data conversion unit 304 selects a path to the data compression unit 307 for the image data and transfers the image data to the data compression unit 307 for coding.

After the image data is coded and the redundant data is compressed in the data compression unit 307, the image data is stored at a predetermined address in the memory module 107 via the memory access control unit 308. The memory module 107 is configured to be detachably attached to the engine board 100. Therefore, the amount of the memory module 107 is increased or decreased according to usage. The memory access control unit 308 controls the memory module 107 such that the memory access control unit 308 can manage the address in a maximum storage area of the memory module 107.

(2) Writing Path

The memory access control unit 308 reads out code data stored in the memory module 107 while searching its address. The read-out code data is decoded in the data decompression unit 309 and is changed to image data. The data conversion unit 304 transfers the image data to the bus control unit 302. The bus control unit 302 transfers the image data to the image to be written processing unit 305 for writing the image data. The image to be written processing unit 305 converts the image data to the data that drives the LD driver provided in the image writing control unit 112. In the image writing control unit 112, a light is emitted from the LD for forming a latent image in the image forming unit 115. The image forming unit 115 reproduces an image on a transfer sheet while performing image forming processes including developing, transferring, and fixing processes.

In the present embodiment, a latent image formation and an electrophotographic process by use of the LD driver are employed. Alternatively, an inkjet process may be employed for image formation.

(3) Input/output Control Path when Operating an Operation Unit

The process controller 102 manages the display of the operation information of the operation unit 110 and the receipt of the operational instruction input by an operator to the operation unit 110 via the CPU periphery control unit 306. In this embodiment, the process controller 102 manages the display of function and maintenance items related to a copying function of the operation unit 110 and the receipt of the copying operational instruction input to the operation unit 110. Therefore, the management of operation items related to expanded functions is not necessary in the present embodiment. For this reason, the configuration of the operation unit 110 may be minimized for managing only the basic (copying) function. For example, the size of a display section may be reduced because the number of menu display items is small and address setting buttons for facsimile are not needed.

Figure 7:
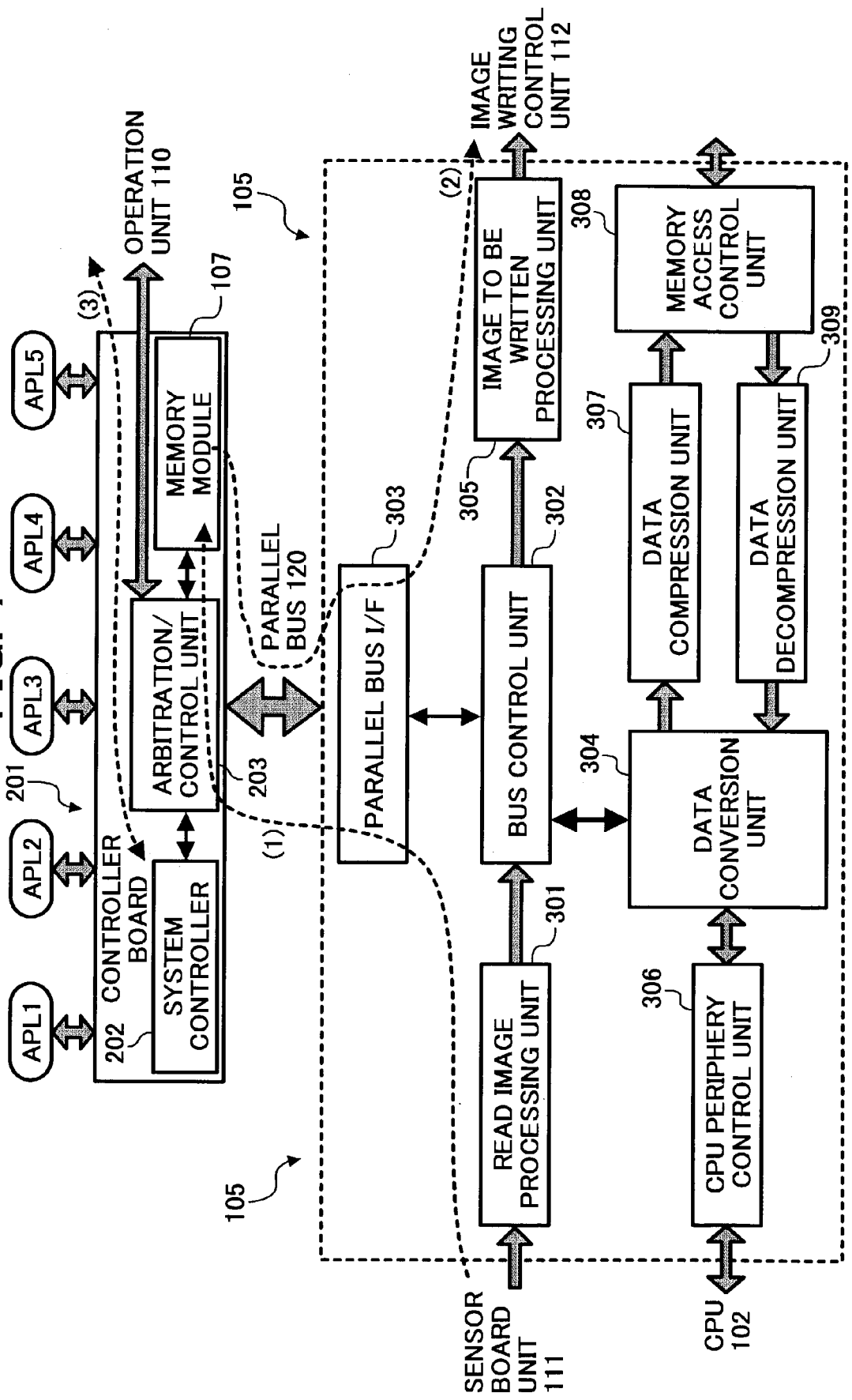
FIG. 7 is a block diagram for explaining respective flows of data in the multi-functional digital image forming apparatus having expanded functions.

FIG. 7 is a block diagram for explaining respective flows of data in the multi-functional digital image forming apparatus having expanded functions. FIG. 7 includes the block diagrams of the configuration of the controller board 201 illustrated in FIG. 3 and the configuration of the video control unit 105 illustrated in FIG. 4.

Referring to FIG. 7, the engine board 100 is connected to the controller board 201 via the parallel bus 120. A plurality of application functions (APL 1 through APL 5) can be added to the controller board 201 serving as a motherboard for expanding application functions. The entire system control of the digital image forming apparatus is controlled by the system controller 202 on the controller board 201. The process controller 102 controls only the engine board 100 side.

The operation unit 110 is used in all the application functions including a copying function in the multi-functional digital image forming apparatus. The system controller 202 manages layout data and command data receipt processing. The layout data includes information regarding the display layout of the operation unit 110 for the selected function such as, for example, the copying function. The memory module 107 for storing image data is provided not on the engine board 100 but on the controller board 201 as a common resource.

The flow indicated by (1) in FIG. 7 is a reading path from the reading of an image of an original document to the storage of image data in a memory. The flow indicated by (2) in FIG. 7 is a path from the reading out of the image data stored in the memory to an image writing control. The flow indicated by (3) in FIG. 7 is an input/output control path when operating an operation unit.

(1) Reading Path

The image data optically read by the sensor board unit 111 and converted into an electrical signal is subjected to the correction processing in the read image processing unit 301. The image data that has been subjected to the correction processing in the read image processing unit 301 is transferred to the parallel bus 120 via the parallel bus I/F 303 by the bus control unit 302. Subsequently, the image data is stored in the memory module 107 from the parallel bus 120 via the arbitration/control unit 203 on the controller board 201. In the arbitration/control unit 203, the image data is processed by the parallel bus control unit 404, the access control unit 402, the compression/decompression unit 417, and the memory control unit 412. Subsequently, code data is stored in the memory module 107.

(2) Writing Path

The code data stored in the memory module 107 on the controller board 201 is read out by the memory control unit 412 in the arbitration/control unit 203. The code data is processed by the access control unit 402, the compression/decompression unit 417, and the parallel bus control unit 404. Subsequently, decoded image data is transferred to the parallel bus 120. On the engine board 100 side, the parallel bus I/F 303 receives the image data transferred from the controller board 201, and then the bus control unit 302 transfers the image data to the image to be written processing unit 305 for writing the image data. The image to be written processing unit 305 converts the image data to the data that drives the LD driver provided in the image writing control unit 112. In the image writing control unit 112, a light is emitted from the LD for forming a latent image in the image forming unit 115. The image forming unit 115 reproduces an image on a transfer sheet while performing image forming processes including developing, transferring, and fixing processes.

(3) Input/output Control Path when Operating an Operation Unit

The system controller 202 on the controller board 201 manages the display of the operation information of the operation unit 110 and the receipt of the operational instruction input by an operator to the operation unit 110 via the local bus control unit 410 and the system I/F 401 in the arbitration/control unit 203. As compared to the operation unit 110 of FIG. 6 used in the copying machine, the operation unit 110 of FIG. 7 used in the multi-functional digital image forming apparatus has greater functionality for expanding functions. For example, the operation unit 110, in which option units are added to a basic unit, includes a large-sized display panel, an input mechanism of address on the network, and address allocation buttons for facsimile, etc.

In the data flow in FIG. 7, because the memory module 107 is not used on the engine board 100, the image data is not transferred to the data compression unit 307, the data decompression unit 309, and the memory access control unit 308 in the video control unit 105. The bus control unit 302 selects data transmission/reception to/from the parallel bus I/F 303 and data transmission/reception to/from the data conversion unit 304 in the video control unit 105 according to the configurations of the image forming apparatus having a basic (copying) function and the multi-functional digital image forming apparatus having expanded functions. Because the process controller 102 is not involved in the display of the operation information of and command input to the operation unit 110, the command data transfer from the operation unit 110 to the process controller 102 via the CPU periphery control unit 306 is not performed.

Figure 8:
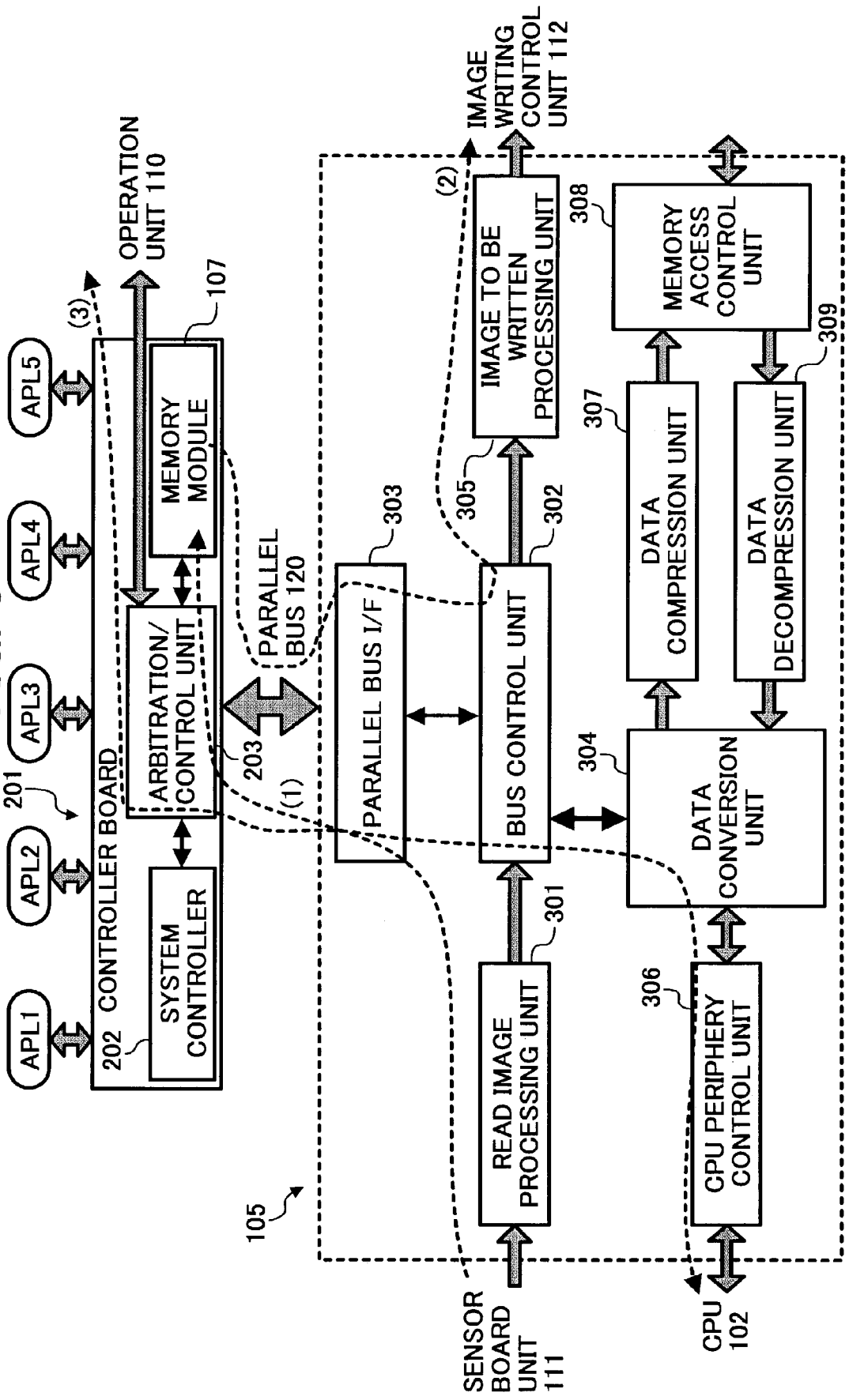
FIG. 8 is a block diagram for explaining respective flows of data in the multi-functional digital image forming apparatus having expanded functions according to another example.

FIG. 8 is a block diagram for explaining respective flows of data in the multi-functional digital image forming apparatus having expanded functions according to another example. In FIG. 8, the flows of data when the process controller 102 on the engine board 100 controls the operation unit 110 are illustrated.

As illustrated in FIG. 8, the reading path (1) and the writing path (2) are similar to those illustrated in FIG. 7. The memory module 107 on the controller board 201 is shared to store image data for copying therein.

(3) Input/output Control Path when Operating an Operation Unit

The operation unit 110 is connected to the controller board 201 as a common resource of the multi-functional digital image forming apparatus, and command data and layout data of the operation unit 110 pass through the arbitration/control unit 203. However, in this example, the process controller 102 on the engine board 100 controls the operation unit 110. The operation unit 110 has great functionality corresponding to the expanded functions of the digital image forming apparatus. The system controller 202 manages resource management and system control for a plurality of application functions. As a share of the load of the system controller 202, the process controller 102 controls display layouts of the operation unit 110.

The arbitration/control unit 203 communicates command data and layout data with the operation unit 110 via the serial bus 407 (illustrated in FIG. 13A). The arbitration/control unit 203 transfers the command data to the parallel bus 120 via the serial bus 407, the serial port 409, the serial port control unit 408, the DMAC 415, the access control unit 402, the DMAC 403, and the parallel bus control unit 404 (illustrated in FIG. 5). The arbitration/control unit 203 obtains the layout data for the operation unit 110 from the parallel bus 120.

The parallel bus 120 is connected to the engine board 100 and has access to the parallel bus I/F 303 in the video control unit 105. In the data flow from the parallel bus 120 to the data conversion unit 304 via the parallel bus I/F 303 and the bus control unit 302, the image data and command data are transmitted to the data conversion unit 304 from the memory module 107 and from the operation unit 110, respectively.

The data conversion unit 304 divides the image data and command data, and transfers the image data to the data compression unit 307, and transfers the command data to the CPU periphery control unit 306. The CPU periphery control unit 306 communicates with the process controller 102.

On the other hand, in the data flow from the data conversion unit 304 to the parallel bus 120 via the bus control unit 302 and the parallel bus I/F 303, the layout data from the process controller 102 to the operation unit 110 and the image data from the data expansion unit 309 are merged at the data conversion unit 304.

When a plurality of the option units are operated at the same time, a layout display speed may be decreased due to the increase of the load of the system controller 202. Therefore, the process controller 102, which has room for performance other than image forming process control, is in charge of the display layouts of the operation unit 110.

As described above, the arrangement of the operation unit 110 is different between in the configurations of the image forming apparatus having a basic (copying) function and of the multi-functional digital image forming apparatus having expanded functions. With regard to the image forming process control, the process controller 102 is involved in the above-described both configurations of the copying machine and the multi-functional digital image forming apparatus while using the resources provided on the engine board 100 side.

Figure 9:
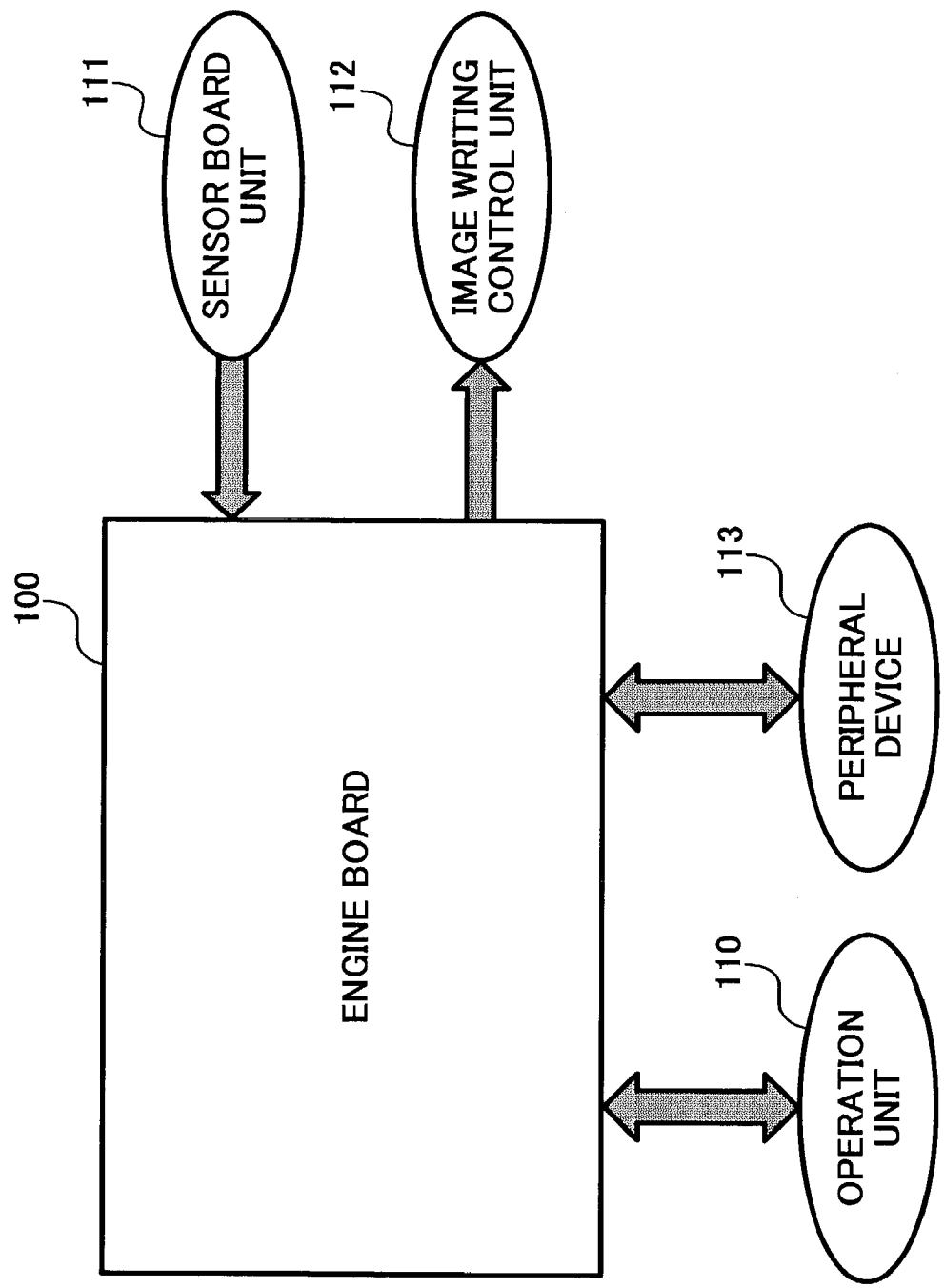
FIG. 9 is a block diagram of a configuration of an image forming apparatus having a basic (copying) function.
Figure 10:
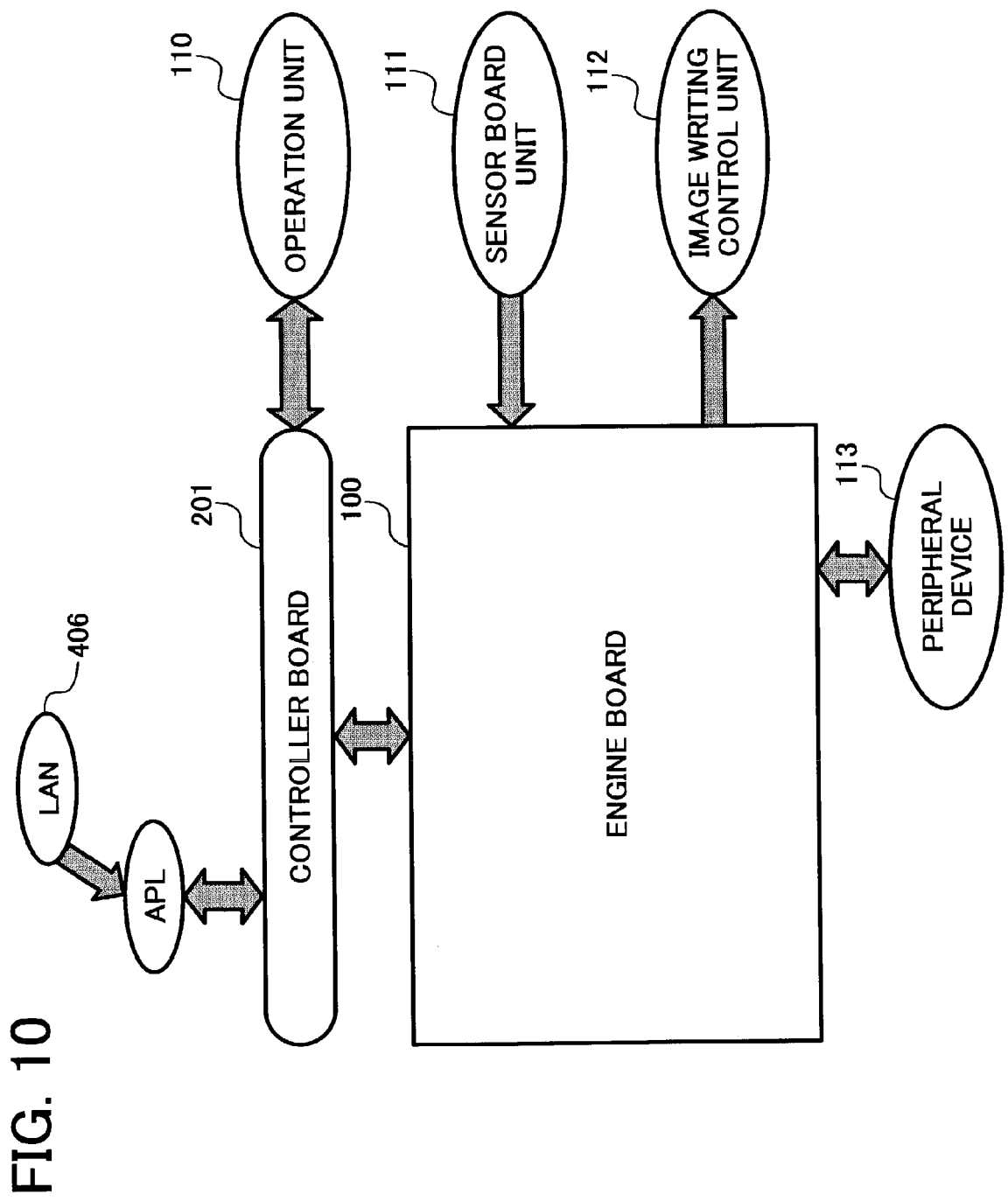
FIG. 10 is a block diagram of a configuration of a digital image forming apparatus having an expanded function.
Figure 11:
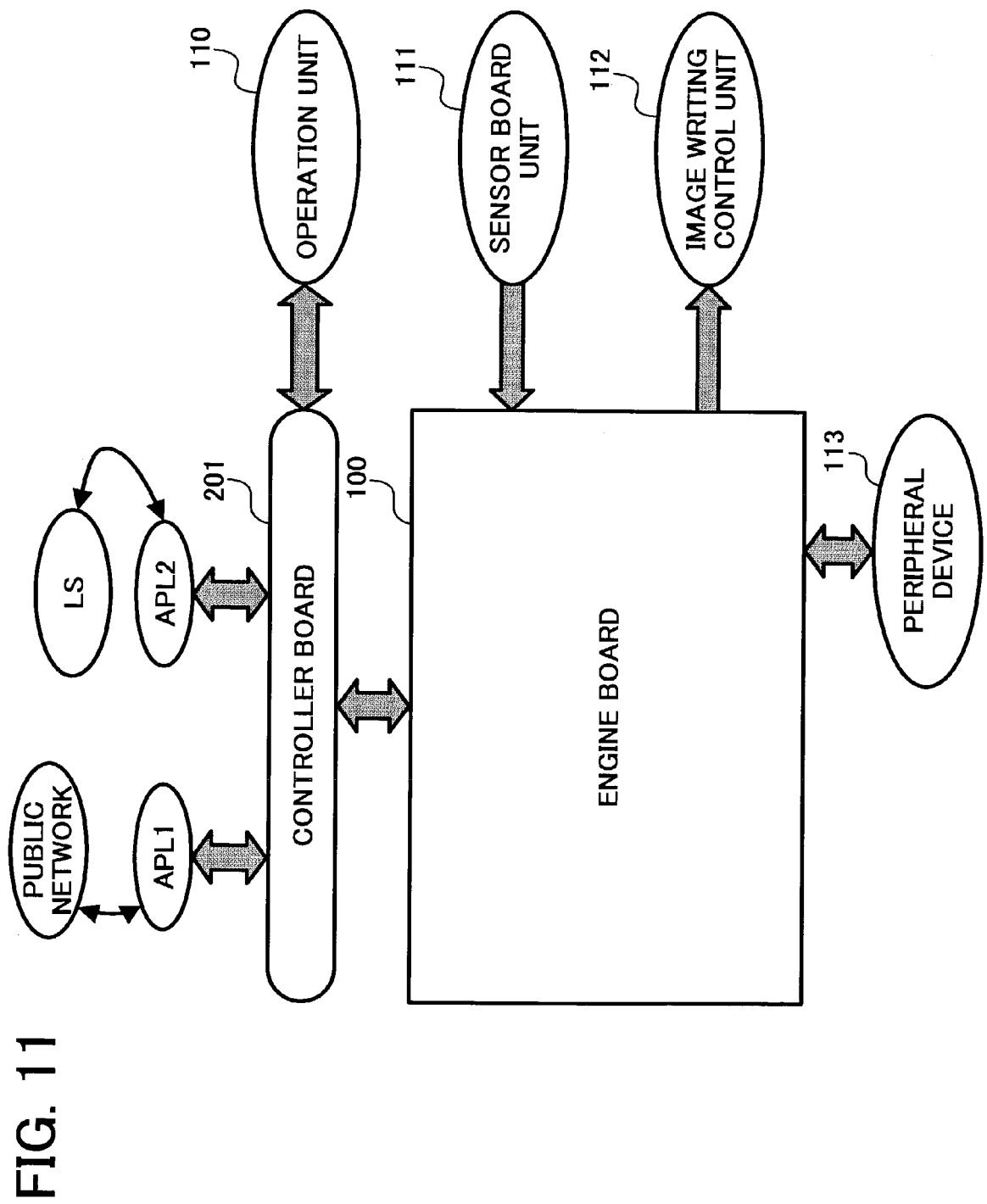
FIG. 11 is a block diagram of a configuration of a digital image forming apparatus having expanded functions according to another example.

In FIGS. 9 through 11, configuration examples are shown according to application functions.

FIG. 9 is a block diagram of a configuration of an image forming apparatus having a basic (copying) function. In the configuration of FIG. 9, the engine board 100 is used without connection to the controller board 201. By use and control of the resources connected to the engine board 100, a basic (copying) function is performed. With the configuration in which the engine board 100 is centered around the sensor board unit 111, the image writing control unit 112, the operation unit 110, and the peripheral device 113, the process controller 102 manages operational instruction input to the operation unit 110, image reading, image reproduction on a transfer sheet, and control of transfer sheets, and allocates all the resources provided on the engine board 100 side to the copying function.

FIG. 10 is a block diagram of a configuration of a digital image forming apparatus having an expanded function. As compared to the configuration of the image forming apparatus having a basic (copying) function illustrated in FIG. 9, one application function (APL) is added to the copying function in the configuration of the digital image forming apparatus in FIG. 10. In the digital image forming apparatus of FIG. 10, the controller board 201 is connected to the engine board 100, and an application function (APL) is added on the controller board 201. The controller board 201 serves as a main control device functioning as a motherboard of the multi-functional digital image forming apparatus.

The basic function of the engine board 100 corresponds to one of the application functions (i.e., a copying application) of the multi-functional digital image forming apparatus. In this configuration, the engine board 100 is used as a shared resource of the multi-functional digital image forming apparatus for the controller board 201.

For example, when the application function (APL) is a network application having a LAN connection function, functions such as delivery of read-out image data to the LAN 406, and reproduction of the image data delivered from the LAN 406 on a transfer sheet are obtained. The multiple functions are achieved by sharing resources under the management of the system controller 202.

The controller board 201 recognizes both the network application function and the copying function of the engine board 100 as equal application functions, and does not assign priorities on the use of resources among application functions. The order of adding the application functions to the controller board 201 does not have an influence on the priorities on the use of resources. The resources are optimally allocated based on the connection condition of the application functions at a predetermined timing.

FIG. 11 is a block diagram of a configuration of a digital image forming apparatus having expanded functions according to another example. As compared to the configuration of the image forming apparatus having a basic (copying) function illustrated in FIG. 9, two application functions are added to the copying function in the configuration of the digital image forming apparatus in FIG. 11. Specifically, two applications (APL1 and APL2) are added on the controller board 201 serving as a motherboard. The controller board 201 does not assign priorities on the order of addition of application functions and the combination of application functions. The controller board 201 recognizes the application functions (APL1 and APL2) and the copying function of the engine board 100 as equal application functions without priorities.

For example, the application function (APL1) has a function of a facsimile that is connected to the public network, and the application function (APL2) has a function of an image storage (LS) having a large capacity. In this configuration, the memory module 107 on the controller board 201 is used as a data storage area for a temporary operation, and the image storage (LS) is used for image storage for a long period of time and for backup. For example, image data sent by facsimile, image data received by facsimile, and image data output by a copying machine are stored in the image storage (LS) as digital data for reading out later.

When network application is added as another application function (APL) on the controller board 201, the image data stored in the image storage (LS) can be accessed from the network. As described above, the function of the image forming apparatus can be easily expanded by adding application functions on the controller board 201.

Figure 12:
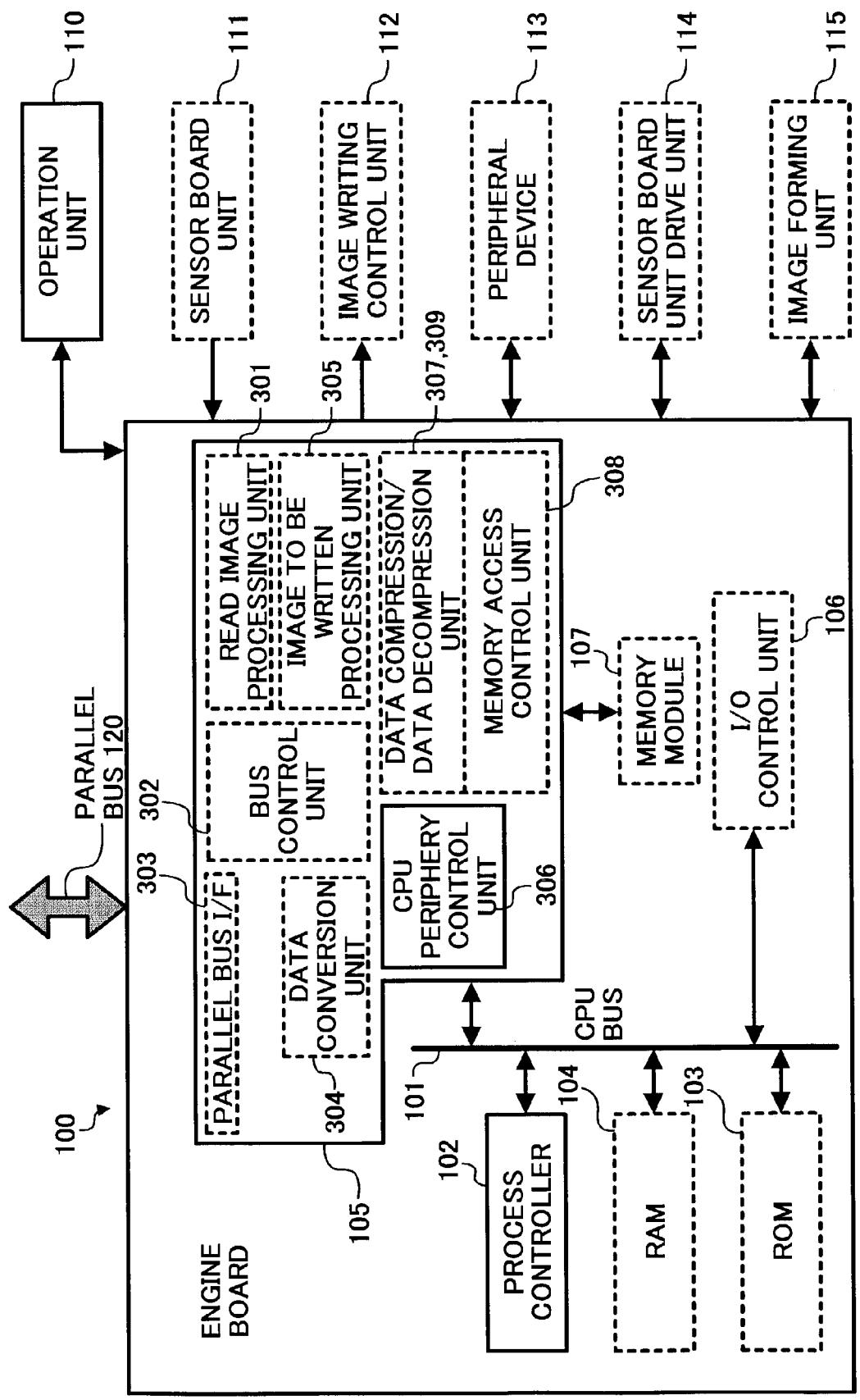
FIG. 12 is a block diagram illustrating a condition of each of the units in an image forming apparatus having a basic function when a system is in a standby mode.

Next, condition of each unit when a system of an image forming apparatus is in a standby mode (hereafter simply referred to as a "system standby mode") will be described referring to FIGS. 12 and 13. FIG. 12 is a block diagram illustrating a condition of each of units in an image forming apparatus having a basic function when a system is in a standby mode. Each of units indicated by dotted lines is a unit or a module that stops functioning in a system standby mode.

In the configuration of the image forming apparatus of FIG. 12 having a basic function, there is no external device that cuts in when a system is in a standby mode. When an operator inputs operational instruction to the operation unit 110, the system standby mode is shifted to a regular operation mode. Therefore, in the system standby mode, only the operation unit 110, the process controller 102 that monitors the operation unit 110, the CPU periphery control unit 306 for the interface, and the CPU bus 101 are activated. Other units and modules need not be operated. Further, the sensor board unit 111 and the image writing control unit 112 need not be energized. Moreover, because the memory module 107 need not be activated, the supply of clock signals or supply of electricity to the memory module 107 can be stopped.

When the function of the units is in a stop condition at the time of system standby mode, the supply of electricity to the units is stopped, and the supply of clock signals is stopped in each of the units in the video control unit 105. When the system is in a standby condition, each operation of units and modules indicated by the dotted lines in FIG. 12 is stopped, thereby reducing power consumption. In the present embodiment, the video control unit 105 is constructed with one chip. Therefore, the number of construction parts of the engine board 100 and the power consumption at the time of operation of the video control unit 105 can be reduced as compared to the case in which the video control unit 105 is constructed with a plurality of chips. Because the video control unit 105 is constructed with one chip, the operation of the units in the video control unit 105 other than the CPU periphery control unit 306 is stopped while stopping the supply of clock signals to each unit when the system is in a standby condition.

Figure 13B:
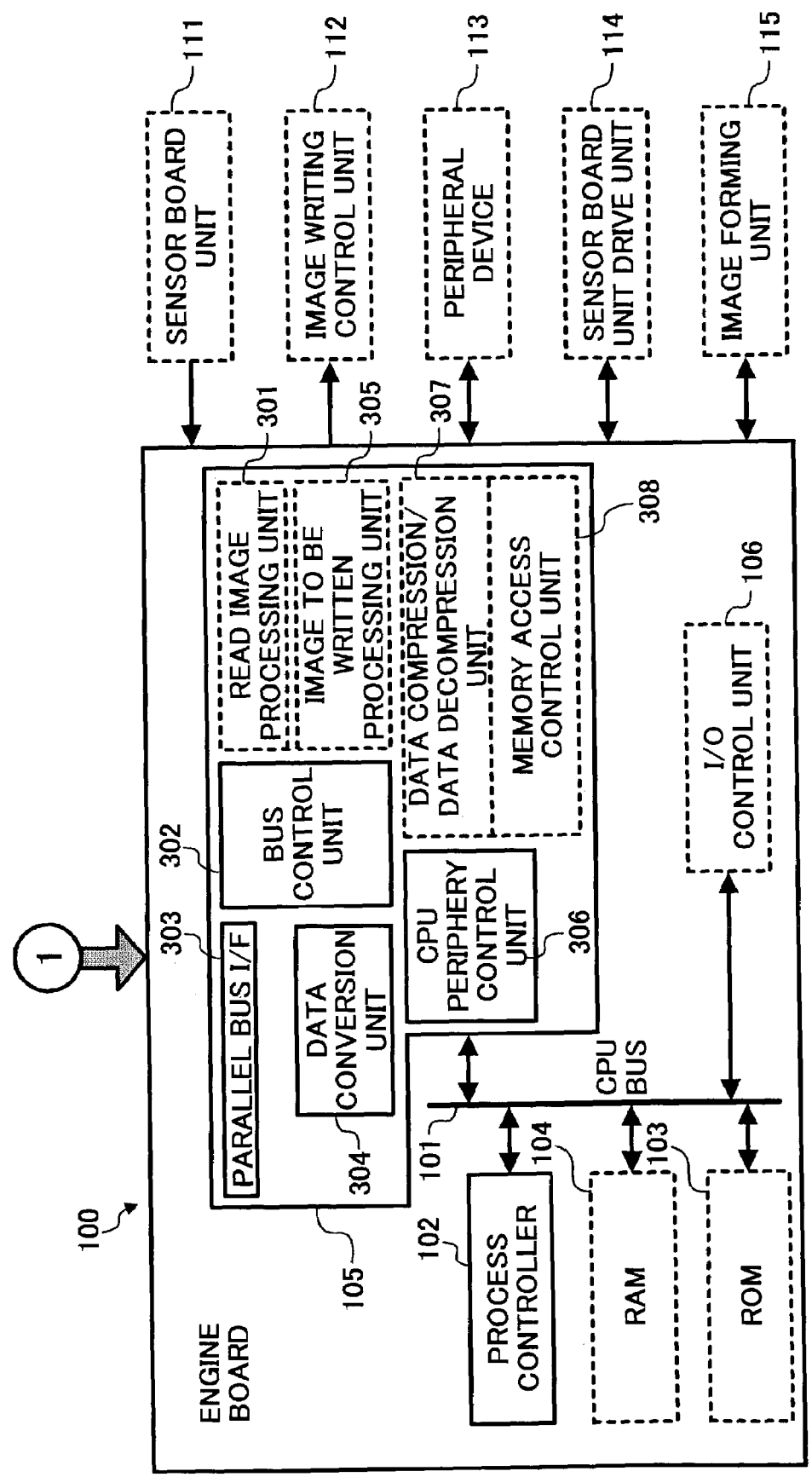
FIG. 13B is a block diagram illustrating a condition of each of the units of the engine board connected to the controller board via the parallel bus.

FIGS. 13A and 13B are block diagrams illustrating a condition of each of units in an image forming apparatus having expanded functions when a system is in a standby mode. In the image forming apparatus having expanded functions, the start of system is requested not only from the operation unit 110 but also from external devices. For example, there are requests to output image data received by a facsimile machine and from the network (LAN). However, because these requests are irregular output requests, undesired power consumption occurs when the entire system is activated all the time.

For the above reasons, in the system standby mode, only the units which have a function of receiving activation requests are activated, and other units and modules are deactivated. In the video control unit 105 on the engine board 100, the units and modules on the path, which transmit the information from the controller board 201 to the process controller 102, such as, the parallel bus I/F 303, the bus control unit 302, the data conversion unit 304, and the CPU periphery control unit 306, are activated even in the system standby mode.

Further, in the controller board 201 in the system standby mode, the memory module 107 is deactivated, and the supply of clock signals to the memory control unit 412 in the arbitration/control unit 203 is stopped. Further, in the controller board 201, the system I/F 401 and the access control unit 402 in the arbitration/control unit 203 and the system controller 202 that monitors the system are activated to detect the activation request. The application functions that are connected to external devices are activated. In the units that are connected to the public network and the network (LAN), only a minimum module required for activation is activated and the local storage (LS) is deactivated.

Figure 14A:
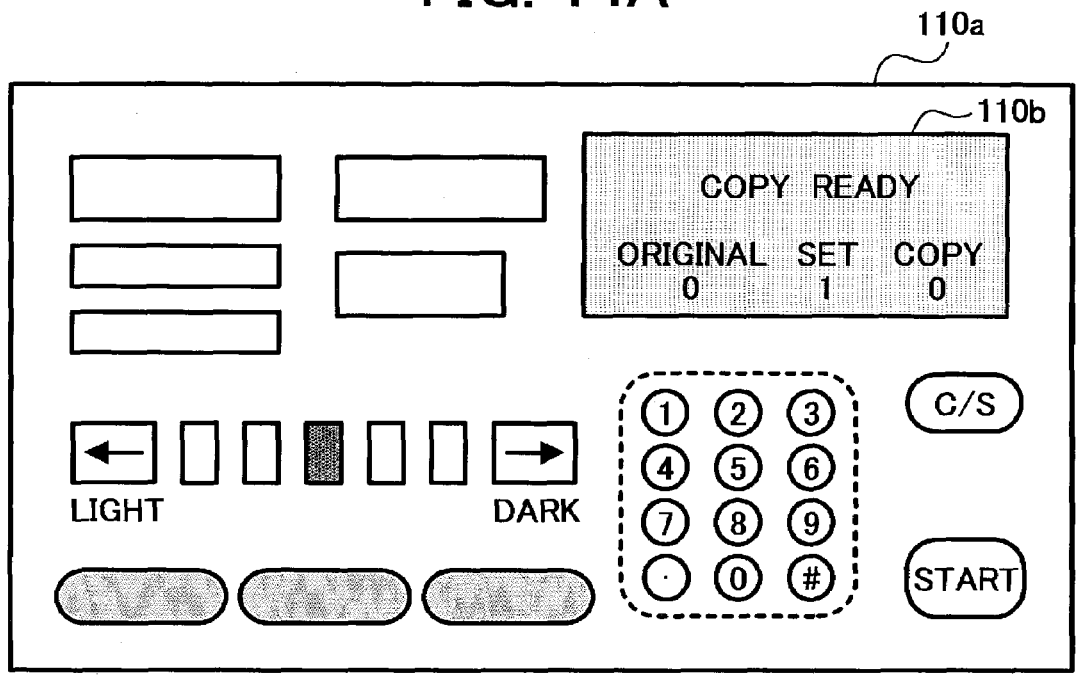
FIG. 14A is a schematic enlarged view of an operation panel of an operation unit in the image forming apparatus having a basic function.
Figure 14B:
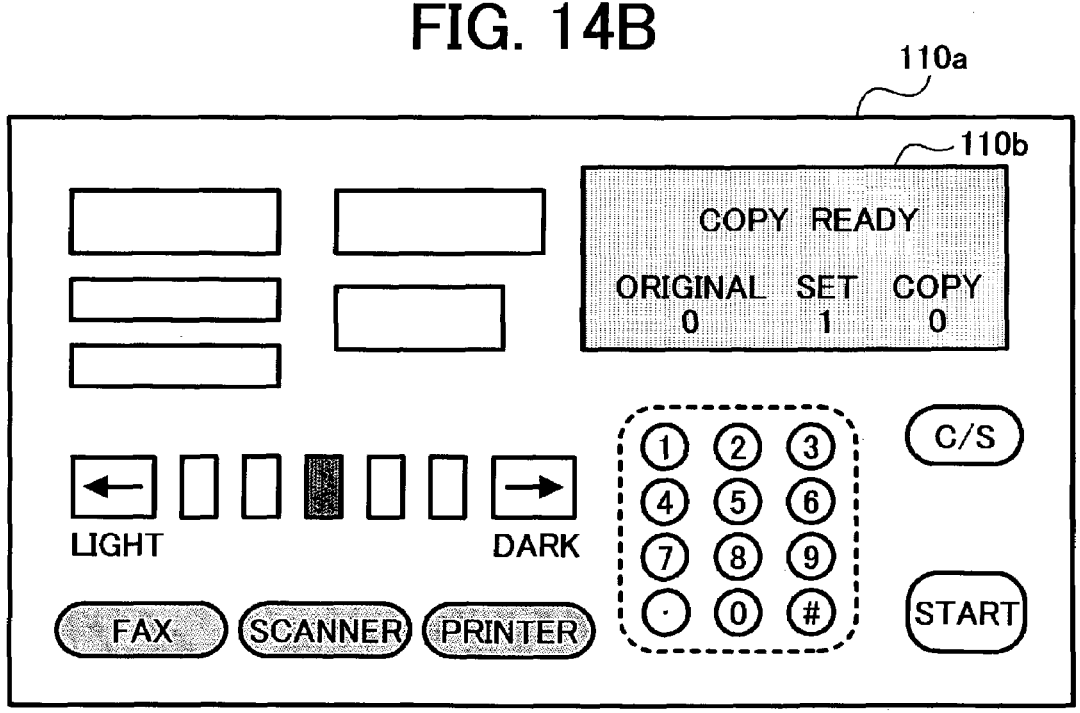
FIG. 14B is a schematic enlarged view of an operation panel of an operation unit in the multi-functional digital image forming apparatus having expanded functions.

FIGS. 14A and 14B are schematic enlarged views of an operation panel 110*a* of the operation unit 110. FIG. 14A illustrates the operation panel 110*a* when the operation unit 110 is connected to the engine board 100 of the image forming apparatus having a basic (copying) function. FIG. 14B illustrates the operation panel 110*a* when the operation unit 110 is connected to the controller board 201 of the digital image forming apparatus having expanded functions. The operation panel 110*a* includes an application function information display section 110*b*, and the copying function information is displayed in each of the application function information display sections 110*b* in FIGS. 14A and 14B.

When the operation unit 110 is connected to the engine board 100, the operation unit of the image forming apparatus having a basic (copying) function, the application function information display section 110b displays the information of the copying function. When the operation unit 110 is connected to the controller board 201, the operation unit of the digital image forming apparatus having expanded functions, the application function information display section 110b displays the information of the copying function and the application functions.

As illustrated in FIGS. 14A and 14B, each of display layouts of the application function information display section 110b for the copying function is identical between when the operation unit 110 is connected to the engine board 100 and when the operation unit 110 is connected to the controller board 201. With this construction, operability of the image forming apparatus can be enhanced, and an operator can handle the operation panel 110a smoothly even when multiple application functions are added to the copying function in the image forming apparatus.

The present invention has been described with respect to the embodiments as illustrated in the figures. However, the present invention is not limited to the embodiment and may be practiced otherwise.

In the above-described embodiment, for example, five application functions (APL1 through APL5) are added to the controller board 201. However, the number of application functions is not limited to five and can be any number.

In the above-described image forming apparatus according to the embodiments of the present invention, an image is reproduced on a transfer sheet by reading an image of an original document mainly by the scanner. As an alternative example, code data may be input to an image forming apparatus from a personal computer, and an image may be output on a transfer sheet in accordance with the code data.

The method of controlling the system configuration according to the above-described embodiments can be achieved by executing a prepared program in a computer, such as, a personal computer and a workstation. The program is recorded in a recording medium which can be read out by a computer, such as a hard disk, a floppy disk, a compact disc read only memory (CD-ROM), a magneto-optical (MO) disk, and a digital versatile disk (DVD), and is run by reading out the program from the recording medium by the computer. Further, this program can be distributed to the image forming apparatus via the above-described recording medium and via a network such as the Internet.

Numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus for performing at least a copying function, comprising:
   an engine board configured to perform image data control;
   an image reading unit configured to read an image of an original document to obtain image data and configured to transfer the image data to the engine board;
   an image forming unit configured to receive the image data from the engine board and to form the image on a transfer sheet based on the image data;
   a controller board detachably connected to the engine board and configured to add at least one application function to the copying function of the image forming apparatus;
   an operation unit configured to receive an operational instruction input by an operator of the image forming apparatus and to display information of at least the copying function of the image forming apparatus; and
   a parallel bus configured to connect the controller board to the engine board and to notify the engine board that the controller board is connected to the engine board when the controller board is connected to the engine board,
   wherein the operation unit displays the information of the copying function and the at least one application function when the controller board is connected to the engine board, and the operation unit displays the information of the copying function when the controller board is detached from the engine board, and
   wherein each of a plurality of display layouts of the operation unit for the copying function is substantially identical between when the controller board is connected to the engine board and when the controller board is detached from the engine board.

2. The image forming apparatus according to claim 1, further comprising an image reading unit drive unit configured to drive the image reading unit based on control signals,
   wherein the image reading unit and the image forming unit are connected to the engine board, and
   wherein the engine board includes:
   an input/output control unit configured to monitor and control control signals input to and output from the image reading unit drive unit, and each connection condition of the operation unit, the image reading unit, and the image forming unit to the engine board,
   a video control unit configured to subject the image data obtained by the image reading unit to image processing,
   an image storing unit configured to store the image data subjected to the image processing in the video control unit, and
   a process controller configured to control respective operations of the operation unit, the input/output control unit, and the video control unit to perform the at least the copying function.

3. The image forming apparatus according to claim 2, wherein the video control unit includes:
   a read-image processing unit configured to subject the image data obtained by the image reading unit to correction processing,
   a memory control unit configured to write and read-out the image data subjected to the correction processing in the read-image processing unit, and
   an image-to-be-written processing unit configured to output the image data subjected to the correction processing in the read-image processing unit to the image forming unit.

4. The image forming apparatus according to claim 2, wherein the video control unit includes:
   a bus control unit configured to switch a bus path for the image data obtained by the image reading unit between when the controller board is detached from the engine board and when the controller board is connected to the engine board, and
   a data conversion unit configured to control the bus path, to merge layout data used for display layout of the operation unit and the image data, and to divide the image data and command data transmitted from the controller board.

5. The image forming apparatus according to claim 2, wherein the image storing unit is detachably attached to the engine board, and wherein the image storing unit is detached from the engine board and is attached to the controller board to store the image data.

6. The image forming apparatus according to claim 2, wherein the at least one application function includes a plurality of application functions, wherein resources of the image forming apparatus which are shared among the copying function and the plurality of application functions include the video control unit, the image storing unit, the image reading unit, the image forming unit, and the image reading unit drive unit, and wherein the controller board includes:

a system controller configured to judge which application functions request to use the resources, and which resources can be used, and a resource arbitration and control unit configured to arbitrate the resources to be allocated for the copying function and the plurality of application functions.

7. The image forming apparatus according to claim 6, wherein the image storing unit is detachably attached to the engine board, wherein the image storing unit is detached from the engine board and is attached to the controller board to store the image data, and wherein the resource arbitration and control unit further includes:

an interface configured to transfer and receive the image data and command data to and from the system controller, and an access control unit configured to adjust requests for access to the image storing unit.

8. The image forming apparatus according to claim 6, wherein the process controller controls operations of the image forming apparatus when the controller board is detached from the engine board, and wherein the system controller controls entire operations of the image forming apparatus, and the process controller controls operations of the engine board, the image reading unit, the image forming unit, and the image reading unit drive unit based on instructions from the system controller when the controller board is connected to the engine board and when the image forming apparatus includes a plurality of application functions.

9. The image forming apparatus according to claim 8, wherein the process controller controls to stop supply of clock signals to any selected units in the video control unit, and to stop supply of electricity to any selected units on the engine board and to the image reading unit, the image forming unit, and the image reading unit drive unit when the image forming apparatus is in a standby condition and when the controller board is detached from the engine board, and wherein the system controller controls to stop supply of electricity to any selected units on the controller board and sends an instruction to the process controller to stop supply of clock signals to any selected units in the video control unit, and to stop supply of electricity to any selected units on the engine board and to the image reading unit, the image forming unit, and the image reading unit drive unit when the image forming apparatus is in a standby condition and when the controller board is connected to the engine board.

10. The image forming apparatus according to claim 1, wherein the operation unit is connected to the controller board when the controller board is connected to the engine board, and the operation unit is connected to the engine board when the controller board is detached from the engine board.

11. The image forming apparatus according to claim 1, wherein:

the at least one application function of the controller board is a facsimile communication function.

12. An image forming apparatus for performing at least a copying function, comprising:

means for performing image data control; a controller board detachably connected to the means for performing image data control and configured to add at least one application function to the copying function of the image forming apparatus;

means for reading an image of an original document to obtain image data and for transferring the image data to the means for performing image data control;

means for receiving the image data from the means for performing image data control and for forming the image on a transfer sheet based on the image data;

means for receiving an operational instruction input by an operator of the image forming apparatus and for displaying information of at least the copying function of the image forming apparatus; and means for connecting the controller board to the means for performing image data control and for notifying the means for performing image data control that the controller board is connected to the means for performing image data control when the controller board is connected to the means for performing image data control, wherein the means for receiving an operational instruction and displaying information displays the information of the copying function and the at least one application function when the controller board is connected to the means for performing image data control, and the means for receiving an operational instruction and displaying information displays the information of the copying function when the controller board is detached from the means for performing image data control, and wherein each of a plurality of display layouts of the means for receiving an operational instruction and displaying information for the copying function is substantially identical between when the controller board is connected to the means for performing image data control and when the controller board is detached from the means for performing image data control.

13. An image forming apparatus for performing at least a copying function, comprising:

an engine board configured to perform image data control;

an image reading unit configured to read an image of an original document to obtain image data and configured to transfer the image data to the engine board;

an image forming unit configured to receive the image data from the engine board and to form the image on a transfer sheet based on the image data;

an operation unit configured to receive an operational instruction input by an operator of the image forming apparatus and to display information of at least the copying function of the image forming apparatus; and a parallel bus configured to connect a controller board to the engine board, the controller board being detachably connected to the engine board to add at least one application function to the copying function of the image forming apparatus, and the parallel bus being configured to notify the engine board that the controller board is connected to the engine board when the controller board is connected to the engine board, wherein the operation unit displays the information of the copying function and the at least one application function when the controller board is connected to the engine board, and the operation unit displays the information of the copying function when the controller board is detached from the engine board, and wherein each of a plurality of display layouts of the operation unit for the copying function is substantially identical between when the controller board is connected to the engine board and when the controller board is detached from the engine board.

14. The image forming apparatus according to claim 13, wherein:

the at least one application function of the controller board is a facsimile communication function.

15. An image forming apparatus for performing at least a copying function, comprising:

means for performing image data control; and means for connecting a controller board to the means for performing image data control, the controller board being detachably connected to the means for performing image data control to add at least one application function to the copying function of the image forming apparatus, and for notifying the means for performing image data control that the controller board is connected to the means for performing image data control when the controller board is connected to the means for performing image data control.

16. The image forming apparatus according to claim 15, further comprising:

means for reading an image of an original document to obtain image data and for transferring the image data to the means for performing image data control; and means for receiving the image data from the means for performing image data control and for forming the image on a transfer sheet based on the image data.

17. The image forming apparatus according to claim 16, further comprising means for receiving an operational instruction input by an operator of the image forming apparatus and for displaying information of at least the copying function of the image forming apparatus, wherein the means for receiving an operational instruction and displaying information displays the information of the copying function and the at least one application function when the controller board is connected to the means for performing image data control, and the means for receiving an operational instruction and displaying information displays the information of the copying function when the controller board is detached from the means for performing image data control, and wherein each of a plurality of display layouts of the means for receiving an operational instruction and displaying information for the copying function is substantially identical between when the controller board is connected to the means for performing image data control and when the controller board is detached from the means for performing image data control.

18. The image forming apparatus according to claim 15, wherein:

the at least one application function added by the controller board is a facsimile communication function.

* * * * *